(12) United States Patent
Lottman et al.

(10) Patent No.: US 6,634,207 B1
(45) Date of Patent: Oct. 21, 2003

(54) ACCELEROMETER COMPENSATION IN AN INERTIAL NAVIGATION SYSTEM

(75) Inventors: Brian T. Lottman, Moorpark, CA (US); Daniel A. Tazartes, West Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 171 days.

(21) Appl. No.: 09/686,165

(22) Filed: Oct. 10, 2000

(51) Int. Cl.[7] ................. G01C 25/00; G01P 21/00

(52) U.S. Cl. ................. 73/1.78; 73/1.38; 702/93; 702/196

(58) Field of Search ................. 73/1.78, 1.38; 702/93, 92, 94, 96, 141, 147, 151, 153, 196

(56) References Cited

U.S. PATENT DOCUMENTS

| | | | | |
|---|---|---|---|---|
| 2,968,957 A | * | 1/1961 | Condie et al. | ........... 235/407 X |
| 3,266,052 A | * | 8/1966 | Yamron | ............... 73/1.78 |
| 5,421,187 A | * | 6/1995 | Morgan | ............... 73/1.78 |
| 6,427,131 B1 | * | 7/2002 | McCall et al. | ............... 702/150 |

FOREIGN PATENT DOCUMENTS

| | | | | |
|---|---|---|---|---|
| EP | 557592 | * | 9/1993 | ........... G01C/25/00 |
| JP | 9-318384 | * | 12/1997 | ........... G01C/25/00 |

OTHER PUBLICATIONS

Derwent–Acc–Noi 2001–135388 abstract of RU 2156959 C1 Sep. 27, 2000 inventor Drothkin et al "Process of Calibration of gyroscopic measuring devices of angular velocity."*

* cited by examiner

Primary Examiner—Thomas P. Noland
(74) Attorney, Agent, or Firm—Robert E. Malm

(57) ABSTRACT

The invention is a method and apparatus for improving the accuracy of an inertial navigation system. The method comprises (1) obtaining a measure of the angular velocity of a body frame of reference having a first axis, a second axis, and a third axis, (2) obtaining a measure of the acceleration of a first reference point in the direction of the first axis, a second reference point in the direction of the second axis, and a third reference point in the direction of the third axis, the first, second, and third reference points being fixed in the body frame, and (3) determining compensated acceleration values. A compensated acceleration value is the difference of the measure of acceleration of a reference point and a compensation quantity. A compensation quantity is an estimate of the portion of the acceleration of the reference point resulting from the rotation of the body frame. The method further comprises establishing the optimum navigation center based on a criterion of goodness. The criterion of goodness is minimal weighted acceleration error where acceleration error is a function of the direction of the angular velocity vector and weighted acceleration error is obtained by multiplying the acceleration error by a weighting function and integrating the result over all directions of the angular velocity vector.

20 Claims, 22 Drawing Sheets

Direction Cosines

Angular Rate Approximation

Angular Acceleration Approximation

|  | Lever Arms [in] | | | | | | | | | $\sqrt{TE}/(w\Delta t)$ [$\mu g$] | |
| --- | --- | --- | --- | --- | --- | --- | --- | --- | --- | --- | --- |
| Type | $R_{xx}$ | $R_{yx}$ | $R_{zx}$ | $R_{xy}$ | $R_{yy}$ | $R_{zy}$ | $R_{xz}$ | $R_{yz}$ | $R_{zz}$ | X | Y |
| S-N | 1.4020 | 0.0700 | 0 | 0.300 | 0.9520 | 0 | -0.03 | -0.07 | -0.8620 | 111 | 75.3 |
| S-O | 0.1202 | -0.8004 | 0.7881 | -1.2518 | 0.0816 | 0.7881 | -1.3118 | -0.9404 | -0.0739 | 35.1 | 39.1 |
| BR-N | 0.8450 | 0 | 0 | 0 | -0.0700 | 0 | 0 | 0.2850 | 0.0090 | 66.8 | 7.02 |
| BR-O | 0.0724 | 0.0518 | -0.0082 | -0.7726 | -0.0182 | -0.0082 | -0.7726 | 0.3368 | 0.0008 | 13.4 | 19.3 |
| CR-N | -0.4400 | 0 | 0 | 0 | -0.5850 | 0 | 0 | 0 | -0.3800 | 30.1 | 46.3 |
| CR-O | -0.0377 | 0.5349 | 0.3474 | 0.4023 | -0.0501 | 0.3474 | 0.4023 | 0.5349 | -0.0326 | 17.5 | 16 |

FIG. 22

ACCELEROMETER COMPENSATION IN AN INERTIAL NAVIGATION SYSTEM

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of DAAN01-95-C-R156 awarded by Redstone Arsenal, Department of the Army.

CROSS-REFERENCE TO RELATED APPLICATIONS (Not applicable)

BACKGROUND OF THE INVENTION

This invention relates generally to inertial navigation systems and more specifically to compensating acceleration measurements for body frame rotation and establishing the optimal center of navigation for a general accelerometer configuration.

Rotation creates centripetal and tangential accelerations which are proportional to the lever arm from the center of rotation to the rotating body. Any rotation through an arbitrary origin should produce zero acceleration at the origin. In a practical inertial navigation system, the three accelerometers cannot share the same origin. As a result, rotation about a reference origin can produce erroneous sensed accelerations and compensation is required.

In the past, the lever arms associated with the tangential acceleration (angular acceleration dependent) terms were small and produced negligible errors compared to the performance requirements. Compensation was based on centripetal (angular rate) terms only.

Some inertial navigation systems use silicon accelerometers mounted on the block in positions where angular acceleration terms produce errors that can approach the performance requirements. In the present invention a complete size effect compensation technique is used that treats both angular rate and angular acceleration terms. The algorithm performance is determined analytically, and used to define the optimal center of navigation for a general accelerometer configuration.

The notation used herein is as follows: a vector is denoted with an overhead arrow, e.g. $\vec{w}$, while a matrix is denoted in boldface, e.g. C.

The direction cosine matrix can be represented analytically by $$C_B^N = \exp(\epsilon \sin(wt)[\vec{1}_\phi x]) \tag{1}$$

and the rate of change of the direction cosine matrix by $$\dot{C}_B^N = C_B^N [\vec{w}x] \tag{2}$$

which means the sinusoidal angular velocity is given by $$\vec{w} = W \vec{1}_\phi \tag{3}$$

$$W = \epsilon w \cos(wt) \tag{4}$$

and angular acceleration is given by $$\dot{\vec{w}} = \frac{d}{dt}\vec{w} = -\epsilon w^2 \sin(wt)\vec{1}_\phi \tag{5}$$

where $\epsilon$ is the magnitude of the angular displacement and w is the frequency about an arbitrary but fixed axis $$\vec{1}_\phi = [c_x c_y c_z] \tag{6}$$

where $$\sqrt{c_x^2 + c_y^2 + c_z^2} = 1, \tag{7}$$

Accelerometers with lever arm vector $\vec{R}$ will sense an acceleration $$\vec{a}_B = ([\vec{w}x]^2 + [\dot{\vec{w}}x])R^B \tag{8}$$

where the cross product $$\vec{\phi} \times \vec{R} = [\vec{\phi}x]\vec{R} \tag{9}$$

where $$[\vec{\phi}x] = \begin{bmatrix} 0 & -\phi_x & \phi_y \\ \phi_x & 0 & -\phi_x \\ -\phi_y & \phi_x & 0 \end{bmatrix} \tag{10}$$

and the cross product $$\vec{\phi} \times [\vec{\phi} \times \vec{R}] = [\vec{\phi}x]^2 \vec{R} \tag{11}$$

where $$[\vec{\phi}x]^2 = \begin{bmatrix} -\phi_y^2 - \phi_x^2 & \phi_x\phi_y & \phi_x\phi_z \\ \phi_x\phi_y & -\phi_x^2 - \phi_z^2 & \phi_y\phi_z \\ \phi_x\phi_z & \phi_y\phi_z & -\phi_x^2 - \phi_y^2 \end{bmatrix} \tag{12}$$

If all three accelerometers shared the same origin, the lever arm $R^B = 0$, and for a navigation center defined as that origin, any angular rate through that origin would not produce measured acceleration in any axis.

The projections on to the X, Y, and Z axis are the body frame accelerations, i.e.

$$\vec{a}_x = P_x([\vec{w}x]^2 + [\dot{\vec{w}}x])\vec{R}_x \tag{13}$$

$$\vec{a}_y = P_y([\vec{w}x]^2 + [\dot{\vec{w}}x])\vec{R}_y \tag{14}$$

$$\vec{a}_z = P_z([\vec{w}x]^2 + [\dot{\vec{w}}x])\vec{R}_z \tag{15}$$

where the projection matrices are $$P_x = \begin{bmatrix} 1 & 0 & 0 \\ 0 & 0 & 0 \\ 0 & 0 & 0 \end{bmatrix} \tag{16}$$

$$P_y = \begin{bmatrix} 0 & 0 & 0 \\ 0 & 1 & 0 \\ 0 & 0 & 0 \end{bmatrix} \tag{17}$$

$$P_z = \begin{bmatrix} 0 & 0 & 0 \\ 0 & 0 & 0 \\ 0 & 0 & 1 \end{bmatrix} \quad (18)$$

and $\vec{R}_x$, $\vec{R}_y$, and $\vec{R}_z$ are the lever arm vectors for accelerometers in the X, Y, and Z directions respectively.

This is a convenient way to write the measured acceleration, since the other elements of the vector are zero, i.e.

$$\vec{a}_x = \begin{bmatrix} a_{B_x} \\ 0 \\ 0 \end{bmatrix}, \vec{a}_y = \begin{bmatrix} 0 \\ a_{B_y} \\ 0 \end{bmatrix}, \vec{a}_x = \begin{bmatrix} 0 \\ 0 \\ a_{B_z} \end{bmatrix} \quad (19)$$

which can also be written as dot products, i.e.

$$a_{Bx} = \vec{a}_x \cdot \vec{1}_x, a_{By} = \vec{a}_y \cdot \vec{1}_y, a_{Bz} = \vec{a}_z \cdot \vec{1}_z \quad (20)$$

where the unit vectors are defined as $$\vec{1}_x = \begin{bmatrix} 1 \\ 0 \\ 0 \end{bmatrix}, \vec{1}_y = \begin{bmatrix} 0 \\ 1 \\ 0 \end{bmatrix}^T, \vec{1}_x = \begin{bmatrix} 0 \\ 0 \\ 1 \end{bmatrix}^T \quad (21)$$

Using the same matrix representations for cross products shown in Equation (10) and Equation (16) but substituting $$\vec{w} = [w_x w_y w_z] \quad (22)$$

$$\vec{\dot{w}} = [\dot{w}_x \dot{w}_y \dot{w}_z] \quad (23)$$

where $$w_x = Wc_x \quad (24)$$

$$w_y = Wc_y \quad (25)$$

$$w_z = Wc_z \quad (26)$$

and for lever arms $$\vec{R}_x = [R_{xx} R_{yx} R_{zx}] \quad (27)$$

$$\vec{R}_y = [R_{xy} R_{yy} R_{zy}] \quad (28)$$

$$\vec{R}_z = [R_{xz} R_{yz} R_{zz}] \quad (29)$$

where $R_{ij}$ is the i'th coordinate of the j'th accelerometer, the acceleration is given by $$a_{Bx} = (-w_y^2 - w_z^2)R_{xx} + (-\dot{w}_z + w_x w_y)R_{yz} + (\dot{w}_y + w_x w_z)R_{zx} \quad (30)$$

$$a_{By} = (\dot{w}_z + w_x w_y)R_{xy} + (-w_x^2 - w_z^2)R_{yy} + (-\dot{w}_x + w_y w_z)R_{zy} \quad (31)$$

$$a_{Bz} = (-\dot{w}_y + w_x w_z)R_{xz} + (\dot{w}_x + w_y w_z)R_{yz} + (-w_x^2 - w_y^2)R_{zz} \quad (32)$$

where $$\vec{a}_B = [a_{Bx} a_{By} a_{Bz}] \text{tm} \quad (33)$$

The lever arms are a measurement of the distances between the accelerometers and the center of navigation.

The direction cosine matrix is used to convert the body (instrument) frame data to the navigation frame, i.e.

$$\vec{a}_N = C_B^N \vec{a}_B. \quad (34)$$

The acceleration in the body frame (see Equations (30)–(32)) is a function of $[\vec{w}x]^2$ which is second order in $\epsilon$ and $[\vec{\dot{w}}x]$ which is first order in $\epsilon$. Therefore, to convert to the navigation frame, only a first order expansion of the direction cosine matrix (see Equation (1)) is required, i.e.

$$C_B^N \approx I + \epsilon \sin(wt)[\vec{1}_q x]. \quad (35)$$

The full matrix multiplication in Equation (34) is not required as only DC terms are of interest. The mean acceleration in the navigation frame is given by $$<a_{Nx}> = \frac{1}{2}\epsilon^2 w^2 [c_y^2(R_{xz} - \underline{R}_{xx}) + c_x^2(R_{xy} - \underline{R}_{xx}) + c_x c_y(\underline{R}_{yx} - R_{yz}) + c_x c_z(\underline{R}_{zx} - R_{zy})] \quad (36)$$

$$<a_{Ny}> = \frac{1}{2}\epsilon^2 w^2 [c_x^2(R_{yz} - \underline{R}_{yy}) + c_z^2(R_{yz} - \underline{R}_{yy}) + c_x c_y(\underline{R}_{xy} - R_{xz}) + c_y c_z(\underline{R}_{zy} - R_{zx})] \quad (37)$$

$$<a_{Nz}> = \frac{1}{2}\epsilon^2 w^2 [c_x^2(R_{zy} - \underline{R}_{zz}) + c_y^2(R_{zx} - \underline{R}_{zz}) + c_x c_z(\underline{R}_{xz} - R_{xy}) + c_y c_z(\underline{R}_{yz} - R_{yz})] \quad (38)$$

The underscore in Equation (36) denotes the angular rate terms, while other terms are related to angular acceleration.

Since the accelerometers are not co-located, the lever arms "corrupt" the navigation center estimate for acceleration. Compensation is required.

BRIEF SUMMARY OF THE INVENTION

The invention is a method and apparatus for improving the accuracy of an inertial navigation system. The method comprises (1) obtaining a measure of the angular velocity of a body frame of reference having a first axis, a second axis, and a third axis, (2) obtaining a measure of the acceleration of a first reference point in the direction of the first axis, a second reference point in the direction of the second axis, and a third reference point in the direction of the third axis, the first, second, and third reference points being fixed in the body frame, and (3) determining compensated acceleration values. A compensated acceleration value is the difference of the measure of acceleration of a reference point and a compensation quantity. A compensation quantity is an estimate of the portion of the acceleration of the reference point resulting from the rotation of the body frame.

The compensation quantity comprises a compensation term proportional to the vector cross product of a first vector and a second vector where the first vector is the angular velocity of the body frame and the second vector is the cross product of the angular velocity of the body frame and the vector connecting the navigation center to a reference point. An estimate of the angular velocity of the body frame is obtained by multiplying each of a plurality of measures of the angular velocity obtained at regular intervals in the past by a weight and summing the weighted measures of the angular velocity obtained during a specified time period in the past. The compensation quantity also comprises a compensation term proportional to the cross product of the angular acceleration of the body frame and the vector connecting the navigation center to a reference point. An estimate of the angular acceleration of the body frame is obtained by multiplying each of a plurality of measures of the angular velocity obtained at regular intervals in the past by a weight and summing the weighted measures of the angular velocity obtained during a specified time period in the past.

The method further comprises establishing the optimum navigation center based on a criterion of goodness. The criterion of goodness is minimal weighted acceleration error where acceleration error is a function of the direction of the angular velocity vector and weighted acceleration error is obtained by multiplying the acceleration error by a weighting function and integrating the result over all directions of the angular velocity vector.

BRIEF DESCRIPTION OF THE DRAWINGS

FIG. 22 show the lever arms for optimal "O" and nominal "N" conditions.

DETAILED DESCRIPTION OF THE INVENTION

Figure 1:
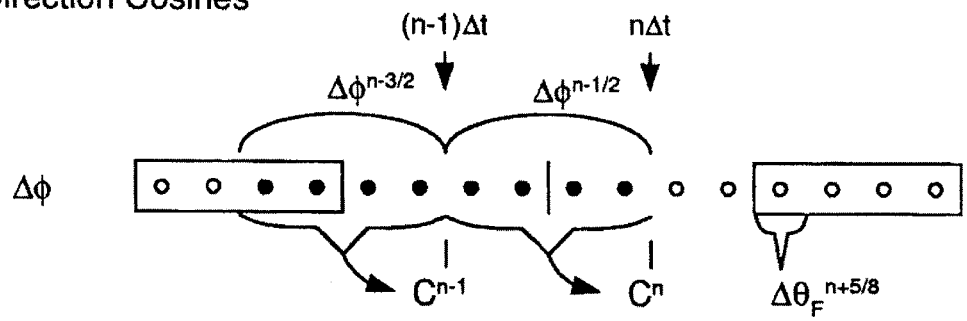
FIG. 1 shows the angular rate processing scheme for producing the direction cosine matrix and measures of the angular velocity and the angular acceleration.
Figure 1:
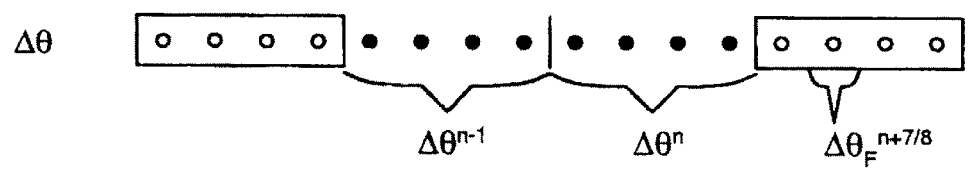
Figure 1:
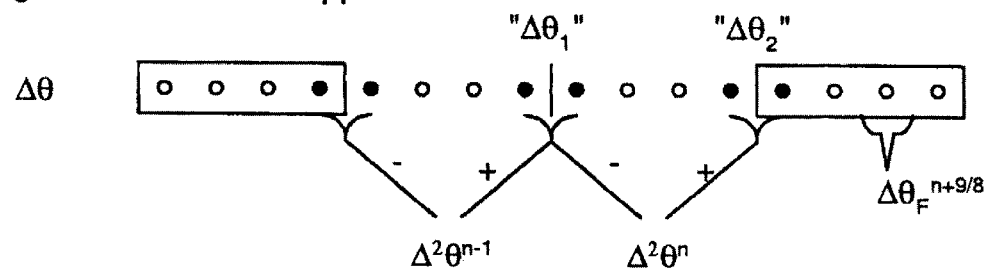

In practical inertial navigation systems, the center of percussion of the three accelerometers cannot physically share the same origin. As a result, rotation of the inertial system about a fixed axis produces erroneous accelerations which require compensation. In this invention a complete compensation which takes into account both angular rate and angular acceleration terms is achieved. The algorithm performance is determined analytically and used to define the optimal center of navigation for a general accelerometer configuration.

An estimate for the change in velocity at interval n with sampling interval $\Delta t$ is the integral of the measured acceleration from half the interval before to half the interval after, i.e.

$$\Delta v_{Bx}{}^n = \int_c^d a_{Bx}(t)dt \tag{39}$$

$$\Delta v_{By}{}^n = \int_c^d a_{By}(t)dt \tag{40}$$

$$\Delta v_{Bz}{}^n = \int_c^d a_{Bz}(t)dt \tag{41}$$

where $c=(n-\frac{1}{2})\Delta t$ and $d=(n+\frac{1}{2})\Delta t$. Integrating Equations (30), (31), and (32), we obtain $$\Delta v_{Bx} = (-c_y{}^2 I_1 - c_z{}^2 I_1) R_{xx} + (-c_z I_2 + c_x c_y I_1) R_{yx} + (c_y I_2 + c_x c_z I_1) R_{zx} \tag{42}$$

$$\Delta v_{By} = (c_z I_2 + c_x c_y I_1) R_{xy} + (-c_x{}^2 I_1 - c_z{}^2 I_1) R_{yy} + (-c_x I_2 + c_y c_z I_1) R_{zy} \tag{43}$$

$$\Delta v_{Bz} = (-c_y I_2 + c_x c_z I_1) R_{xz} + (c_x I_2 + c_y c_z I_1) R_{yz} + (-cx^2 I_1 - c_y{}^2 I_1) R_{zz} \tag{44}$$

where $$I_{1,n} = \int_c^d W^2 dt \tag{45}$$

$$I_{2,n} = \int_c^d \dot{W} dt. \tag{46}$$

The body frame change in velocity at interval n is given by $$\Delta \vec{v}_B^n = [\Delta v_{Bx}^n \Delta v_{By}^n \Delta v_{Bz}^n]^T \quad (47)$$

where T denotes the transpose of the vector.

The compensated change in velocity in the body frame is given by $$\Delta \vec{v}_c^n = \Delta \vec{v}_B^n - \Delta \vec{v}_{BC}^n \quad (48)$$

where $$\Delta \vec{v}_{BC}^n = \begin{bmatrix} \int_a^b \left( [\vec{w}(t)x]^2 \vec{R}_x + [\vec{w}(t)x] \vec{R}_x \right) \cdot \vec{i}_x dt \\ \int_a^b \left( [\vec{w}(t)x]^2 \vec{R}_y + [\vec{w}(t)x] \vec{R}_y \right) \cdot \vec{i}_y dt \\ \int_a^b \left( [\vec{w}(t)x]^2 \vec{R}_z + [\vec{w}(t)x] \vec{R}_z \right) \cdot \vec{i}_z dt \end{bmatrix}^T \quad (49)$$

and $\Delta \vec{v}_B^n$ is the change in velocity in the body frame at time interval n and ideally $a = n - \frac{1}{2}$ and $b = n + \frac{1}{2}$. The dot product in Equation (49) eliminates the need for the projection matrices shown in Equations (13)–(15).

In an actual system $\vec{w}(t)$ and $\dot{\vec{w}}(t)$ are not available, as only the incremental angles $\Delta \vec{\theta}$ are provided. This term is a sum of higher speed angular rate data. The system has the flexibility of summing over different time intervals, giving the user the ability to make terms such as the direction cosine matrix valid at the appropriate time.

There are two terms from Equation 49 that need to be approximated from available data:

$$A^n = \int_a^b [\vec{w}(t)x]^2 dt \quad (50)$$

$$B^n = \int_a^b [\vec{w}(t)x] dt \quad (51)$$

The first term can be approximated as $$A^n \approx [\hat{\vec{w}}^n x]^2 \Delta t \quad (52)$$

where $$\hat{\vec{w}}^n = \frac{\Delta \vec{\theta}^n}{\Delta t} [\text{rad/s}] \quad (53)$$

$$\Delta \vec{\theta}^n = \sum_{k=0}^{3} \Delta \vec{\theta}_F^{n - \frac{3}{8} + \frac{1}{4}k} [\text{rad}] \quad (54)$$

where $\Delta \vec{\theta}_F$ are the high speed incremental angles provided by the gyros (see FIG. 1 for a one-dimensional example). FIG. 1 shows an angular rate processing scheme for producing the direction cosine matrix, the angular rotation, and the change in angular rotation.

The change in angular rotation $\Delta \vec{\theta}$ is useful for approximating B in Equation (51). This requires differencing sums of high speed incremental angles $\Delta \vec{\theta}$'s, i.e.

$$\Delta^2 \vec{\theta}^n = \underbrace{\sum_{k=0}^{1} \Delta \vec{\theta}_F^{n + \frac{3}{8} + \frac{1}{4}k}}_{\Delta \vec{\theta}_2} - \underbrace{\sum_{k=0}^{1} \Delta \vec{\theta}_F^{n + \frac{5}{8} + \frac{1}{4}k}}_{\Delta \vec{\theta}_1} [\text{rad}] \quad (55)$$

where $\Delta \vec{\theta}_1$ and $\Delta \vec{\theta}_2$ are built and provided by the system, as shown in FIG. 1.

For compensation the angular accelerations are required, and since $\Delta \vec{\theta}_1$ and $\Delta \vec{\theta}_2$ are the change in angle over the time interval $\Delta t/2$ while the difference between the two is a change over time interval $\Delta t$, $$\begin{aligned} \hat{\dot{\vec{w}}}^n &= \frac{1}{\Delta t} \left[ \frac{2}{\Delta t} \Delta \vec{\theta}_2 [\text{rad/s}] - \frac{2}{\Delta t} \Delta \vec{\theta}_1 [\text{rad/s}] \right] [\text{rad/s}^2] \\ &= \frac{2}{\Delta t^2} [\Delta \vec{\theta}_2 - \Delta \vec{\theta}_1] [\text{rad/s}^2] \\ &= \frac{2}{\Delta t^2} \Delta^2 \vec{\theta}^n [\text{rad/s}^2] \end{aligned} \quad (56)$$

Noise on the high speed angle data $\Delta \vec{\theta}_F^n$ can produce error in the angular acceleration estimates $$\hat{\dot{\vec{w}}}^n.$$

The strategy of using $\Delta \vec{\theta}_1$ in both the $\Delta^2 \vec{\theta}^{n-1}$ and $\Delta^2 \vec{\theta}^n$ estimates minimizes these effects (see FIG. 1). Equation (51) is then approximated as $$B_n \approx \left[ \hat{\vec{w}}^n x \right] \Delta t \quad (57)$$

Then rewriting Equation (48) in a simplified form (dropping the dot product notation):

$$\Delta \hat{\vec{v}}_c^n = \Delta \vec{v}_B^n - \Delta t \left[ \left[ \hat{\vec{w}}^n x \right]^2 \vec{R} + \left[ \hat{\dot{\vec{w}}}^n x \right] \vec{R} \right] \quad (58)$$

At time index $n\Delta t$, the high speed angular rate data from the system is available up to $(n + \frac{3}{8})\Delta t$ (see FIG. 1). This means that the $\Delta^2 \vec{\theta}^n$ term shown in Equation (55) uses future data; i.e. at time index $n\Delta t$ only $\Delta^2 \vec{\theta}^{n-1}$ is available. The compensation must rely on partially old data, or rewriting Equation (58):

$$\Delta \hat{\vec{v}}_c^n = \Delta \vec{v}_B^n - \Delta t \left[ \left[ \hat{\vec{w}}^n x \right]^2 \vec{R} + \left[ \hat{\dot{\vec{w}}}^{n-1} x \right] \vec{R} \right] \quad (59)$$

The direction cosine matrix is used to convert the body (instrument) frame data to the navigation frame. It is computed in the system from the angular rates w(t) using a different integration interval than for the $\Delta \theta$; i.e.

$$\Delta \vec{\phi}^{(n-1/2)} = \sum_{k=0}^{s} \Delta \vec{\theta}_F^{n - \frac{7}{8} + \frac{1}{4}k} \quad (60)$$

as shown in FIG. 1. This makes the direction cosine matrix valid at time index nΔt (see FIG. 1). The angle $$\vec{\phi}^n = \sum_{k=0}^{n} \Delta\vec{\phi}^{k-1/2} \tag{61}$$

The direction cosine matrix in Equation (1) is equivalently $$C_B^{N,n} = I + \frac{\sin|\vec{\phi}^n|}{|\vec{\phi}^n|}[\vec{\phi}^n x] + \frac{1-\cos|\vec{\phi}^n|}{|\vec{\phi}^n|^2}[\vec{\phi}^n x]^2 \tag{62}$$

where $|\vec{\phi}|$ is the magnitude of vector $\vec{\phi}$.

The corrected change in velocity in the navigation frame is given by $$\Delta\vec{v}_N^n = C_B^{N,n} \Delta\vec{v}_c^n \tag{63}$$

$$= C_B^{N,n}\left(\Delta\vec{v}_B^n - \Delta t\left[\left[\hat{w}^n x\right]^2 \vec{R} + \left[\hat{w}^{n-1} x\right]\vec{R}\right]\right)$$

which can be broken into two terms:

$$\Delta\vec{v}_N^n = C_B^{N,n}\left(\Delta\vec{v}_B^n - \Delta t\left[\hat{w}^n x\right]^2 \vec{R}\right) - C_B^{N,n}\left(\Delta t\left[\hat{w}^{n-1} x\right]\vec{R}\right) \tag{64}$$

The error in the second term is the delayed frequency rate term $\vec{w}^{n-1}$ compounded by multiplication of the current direction cosine matrix $C_B^{N,n}$. That is, the acceleration term is transformed with the wrong direction cosine matrix. For this second term, it would be more appropriate to delay the direction cosine matrix where $$C_B^{N,n-1} \approx C_B^{N,n}[I - \Delta\vec{\phi}^{n-1/2}x] \tag{65}$$

is an estimate for the direction cosine matrix delayed one interval. Since the dot products are omitted, it is easier to keep the three terms in Equation (64) separate. The compensated change in velocities then simplify to $$\Delta\vec{v}_N^n = C_B^{N,n}[\Delta\vec{v}_B^n - \Delta\vec{v}_{BC}^n] \tag{66}$$

where $$\Delta\vec{v}_{BC}^n = \underbrace{\Delta t[\hat{w}^n x]^2 \vec{R}}_{DOT} + \left[I - \Delta\vec{\phi}^{n-1/2}x\right]\underbrace{\Delta t[\hat{w}^{n-1} x]\vec{R}}_{DOT} \tag{67}$$

To extract the three-axis information, the underbraced region in Equation (67) requires the dot product manipulation shown in Equation (49). If $$\Delta\vec{v}_{BC}^n = [\Delta\hat{v}_{BCx}^n \Delta\hat{v}_{BCy}^n \Delta\hat{v}_{BCz}^n]^T \tag{68}$$

then simplifying Equation (67), $$\Delta\hat{v}_{BCx}^n = \Delta t[R_{xx}(-\hat{w}_y^2 - \hat{w}_z^2) + R_{yx}(\hat{w}_x\hat{w}_y) + R_{zx}(\hat{w}_x\hat{w}_z)] + \tag{69}$$

$$\Delta t[\hat{w}_x(-\Delta\phi_x R_{zy} - \Delta\phi_y R_{yz}) +$$

$$\hat{w}_y(R_{zx} + \Delta\phi_y R_{xx}) + \hat{w}_z(-R_{yx} + \Delta\phi_z R_{xy})]$$

-continued $$\Delta\hat{v}_{BCy}^n = \Delta t[R_{xy}(\hat{w}_x\hat{w}_y) + R_{yy}(-\hat{w}_x^2 - \hat{w}_z^2) + R_{zy}(\hat{w}_y\hat{w}_z)] + \tag{70}$$

$$\Delta t[\hat{w}_x(\Delta\phi_x R_{yz} - R_{zy}) +$$

$$\hat{w}_y(-\Delta\phi_z R_{zy} - \Delta\phi_x R_{xx}) + \hat{w}_z(\Delta\phi_x R_{xx} + R_{xy})]$$

$$\Delta\hat{v}_{BCz}^n = \Delta t[R_{xx}(\hat{w}_x\hat{w}_z) + R_{yz}(\hat{w}_y\hat{w}_z) + R_{zz}(-\hat{w}_x^2 - \hat{w}_y^2)] + \tag{71}$$

$$\Delta t[\hat{w}_x(\Delta\phi_x R_{zy} + R_{yz}) + \hat{w}_y(\Delta\phi_y R_{xx} - R_{xx}) +$$

$$\hat{w}_z(-\Delta\phi_y R_{yx} - -\Delta\phi_x R_{xy})]$$

All the $\hat{w}$ terms are at n, the $\hat{w}$ are at n−1, and the Δφ terms are at n−½ (see Equation (67)).

Figure 2:
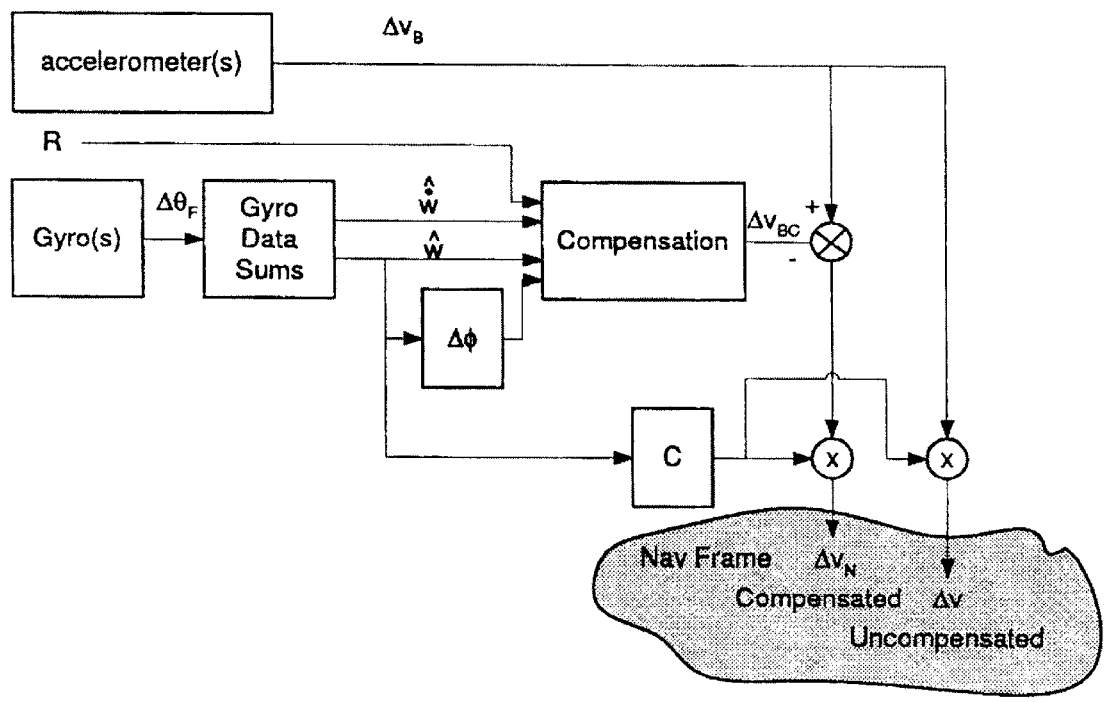
FIG. 2 shows complete size effect compensation using actual instrument data.

A block diagram of the compensation technique given actual instrument data is shown in FIG. 2.

The compensation shown in Equations (69)–(71) applies to a general rotational input from an arbitrary direction (i.e. not limited to rotation about the origin of the coordinate frame). The special case of rotational input about the origin of the coordinate frame (i.e. navigation center) is useful for evaluating algorithm performance because after compensation, the velocity in the navigation frame should be zero. Therefore, the compensated velocity in the body frame (see Equation (66)) is treated as a velocity error $$\vec{E}_B = \Delta\vec{v}_B^n - \Delta\vec{v}_{BC}^n. \tag{72}$$

while the velocity in the navigation frame is also treated as a velocity error $\Delta\vec{v}_N^n \to \vec{E}_N$.

For $$\vec{E}_B = [E_{Bx} \ E_{By} \ E_{Bz}] \tag{73}$$

the error in the body frame is given by $$E_{Bx} = T_1[(c_y^2 + c_x$$

$$2)R_{xx} - c_x c_y R_{yx} -$$

$$c_x c_z R_{zx}] + T_3[-c_z R$$

$$yx + c_y R_{xx}] + T_2[-c$$

$$z^2 R_{xx} + c_x c_z R$$

$$zy - c_y^2 R_{xx} + c$$

$$xc_y R_{yx}] \tag{74}$$

$$E_{By} = T_1[-c_x c_y R$$

$$xy + (c_x^2 + c_z^2)R_{yy} - c$$

$$yc_z R_{zy}] + T_3[c_z R$$

$$xy - c_x R_{xx}] + T$$

$$2[-c_x^2 R_{yz} + c_y c_z R_{xx} +$$

$$c_x c_y R_{xx} - c_z^2 R_{yx}] \tag{75}$$

$$E_{Bz} = T_1[-c_x c_z R$$

$$xz - c_y c_z R_{yz} + (c_x$$

$$2 + c_y^2)R_{xz}] + T_3[-c$$

$$yR_{xx} + c_x R_{yx}] + T_2$$

$$[-c_x^2 R_{zy} - c_y^2 R_{xx} c$$

$$yc_z R_{yx} + c_x c_z R_{xx}] \tag{76}$$

where $$T_1 = -I_{1,n} + \Delta t(\hat{w}_x^n)^2 \tag{77}$$

$$T_2 = \Delta t(\hat{w}_x^{n-1})\Delta\phi_x^{n-\frac{1}{2}} \tag{78}$$

$$T_3 = I_{2,n} - \Delta t(\hat{w}_x^{n-1}) \tag{79}$$

The velocity error in the navigation frame (substituting Equation (72) into Equation (66)) is given by $$\vec{E}_N^n = C_B^{N,n} \vec{E}_B^n \tag{80}$$

which is described in element form by $$\vec{E}_N = [E_{Nx}\ E_{Ny}\ E_{Nz}]. \tag{81}$$

Since $\vec{\phi} = \phi \vec{1}_\phi$ (see Equations 3, 6, and 61), the velocity error in the navigation frame is given by $$E_{Nx} = (1-(1-\cos(\phi))(c_y^2+c_z^2))E_{Bx} + (c_x c_y(1-\cos(\phi))-c_z\sin(\phi))E_{By} + (c_x c_z(1-\cos(\phi))+c_y\sin(\phi))E_{Bz} \tag{82}$$

$$E_{Ny} = (c_x c_y(1-\cos(\phi))+c_z\sin(\phi))E_{Bx} + (1-(c_x^2 c_z^2)(1-\cos(\phi)))E_{By} + (c_y c_z(1-\cos(\phi))-c_x\sin(\phi))E_{Bz} \tag{83}$$

$$E_{Nz} = (c_x c_z(1-\cos(\phi))-c_y\sin(\phi))E_{Bx} + (c_y c_z)(1-\cos(\phi))+c_x\sin(\phi))E_{By} + (1-(c_x^2 c_y^2)(1-\cos(\phi)))E_{Bz} \tag{84}$$

which depends on the estimation error in angular rate $T_1$, estimation error in change in angular rate $T_3$, error due to using delayed version of angular rate $T_2$, and the magnitude $\epsilon$, applied direction $[c_x\ c_y\ c_z]$, and frequency w.

An analytic example of the forgoing follows. For the angular rotation shown in Equation (3) the angular rate vector (X, Y, and Z components) is given by $$\Delta\vec{\phi}^n = \int_{(n-1/2)\Delta t}^{(n+1/2)\Delta t} \vec{w}(t)\,dt \tag{85}$$

the change in angular rate is given by $$\Delta^2\vec{\theta}^n = \int_{(n-1/4)\Delta t}^{(n+3/4)\Delta t} \vec{w}(t)\,dt - \int_{(n-3/4)\Delta t}^{(n+1/4)\Delta t} \vec{w}(t)\,dt \tag{86}$$

and the corrections for the direction cosines is given by $$\Delta\vec{\phi}^{(n-1/2)} = \int_{(n-1)\Delta t}^{n\Delta t} \vec{w}(t)\,dt. \tag{87}$$

For data at time t=0 (i.e. n=0), the angular information for the direction cosine matrix is collected back to t=$-\Delta t$ (See FIG. 1). Thus, $$\vec{\phi}^n = \int_{-\Delta t}^{n\Delta t} \vec{w}(t)\,dt. \tag{88}$$

and for consistency the angle is also a sum starting at t=$-\Delta t$. Therefore, $$\vec{\phi}^n = \int_{-\Delta t}^{(n+1/2)\Delta t} \vec{w}(t)\,dt.$$

As an example, suppose the input angular rate is only in the X direction with frequency w, i.e.

$$\vec{w} = \epsilon w \cos(wt)\vec{1}_x \tag{90}$$

$$\vec{\dot{w}} = -\epsilon w^2 \sin(wt)\vec{1}_x \tag{91}$$

i.e. $c_x=1$, $c_y=0$, and $c_z=0$. Then, $$\vec{w}^n = \epsilon w \cos(wn\Delta t)\vec{1}_x \tag{92}$$

$$\vec{\dot{w}}^n = -\epsilon w^2 \sin(wn\Delta t)\vec{1}_x. \tag{93}$$

To generate the change in velocity data in the body frame (see Equations (42)–(46)), $$I_{1,n} = \frac{\epsilon^2 w^2 \Delta t}{2} + \frac{\epsilon^2 w}{2}\sin(w\Delta t)\cos(2nw\Delta t) \tag{94}$$

$$I_{2,n} = -2\epsilon w \sin(\tfrac{1}{2}w\Delta t)\sin(nw\Delta t) \tag{95}$$

then Equations (42)–(44) simplify to $$\Delta v_x = 0 \tag{96}$$

$$\Delta v_y = -I_1 R_{yy} - I_2 R_{zy} \tag{97}$$

$$\Delta v_z = I_2 R_{yz} - I_1 R_{zz}. \tag{98}$$

Then change in angular rate is given by $$\Delta\vec{\theta}^n = 2\epsilon \sin(\tfrac{1}{2}w\Delta t)\cos(nw\Delta t)\vec{1}_x, \tag{99}$$

$$\Delta\vec{\theta}^n = 2\epsilon[\cos(\tfrac{3}{4}w\Delta t) - \cos(\tfrac{3}{4}w\Delta t)]\sin(nw\Delta t)\vec{1}_x. \tag{100}$$

The correction to the direction cosine is given by $$\Delta\vec{\phi}^{(n-1/2)} = \epsilon[\sin(nw\Delta t) - \sin((n-1)w\Delta t)]\vec{1}_x. \tag{101}$$

To form the direction cosine, we obtain $$\vec{\phi}^n = \epsilon[\sin(nw\Delta t) + \sin(w\Delta t)]\vec{1}_x. \tag{102}$$

The angle $\vec{\theta}^n$ is given by $$\vec{\theta}^n = \epsilon[\sin((n+\tfrac{1}{2})w\Delta t) + \sin(w\Delta t)]\vec{1}_x. \tag{103}$$

The direction cosine matrix is produced by combining Equation 62 and Equation 102:

$$C_B^{N,n} = \begin{bmatrix} 1 & 0 & 0 \\ 0 & \cos(\phi_x^n) & -\sin(\phi_x^n) \\ 0 & \sin(\phi_x^n) & \cos(\phi_x^n) \end{bmatrix} \tag{104}$$

The SIAC accelerometer configuration on the block is such that the position of the center of percussion for the X, Y, and Z axis accelerometers are $$\vec{X}_P = [1.317\ -0.055\ 0.155]$$

$$\vec{Y}_P = [-0.0550\ 0.8270\ 0.155]$$

$$\vec{Z}_P = [-0.1150\ -0.1950\ -0.707] \tag{105}$$

respectively, where the dimensions are in inches, and assuming an arbitrary but fixed coordinate frame origin.

The lever arms need to reflect distances from the accelerometers to the navigation center. Usually lever arms are measured from a convenient reference frame (i.e. Equation (105)) and adjusted when the navigation center is defined. For a center of navigation using a simple splitting-the-differences technique $$\vec{N}_C = [-0.0850 \ -0.0125 \ 0.155] \tag{106}$$

the transformed lever arms (i.e. such that the navigation center is at zero) are $$\vec{R}_x = \vec{X}_P - \vec{N}_C = [1.402 \ 0.070 \ 0] \tag{107}$$
$$\vec{R}_y = \vec{Y}_P - \vec{N}_C = [0.030 \ 0.8395 \ 0]$$
$$\vec{R}_z = \vec{Z}_P - \vec{N}_C = [-0.030 \ -0.07 \ -0.8620]$$

Figure 3:
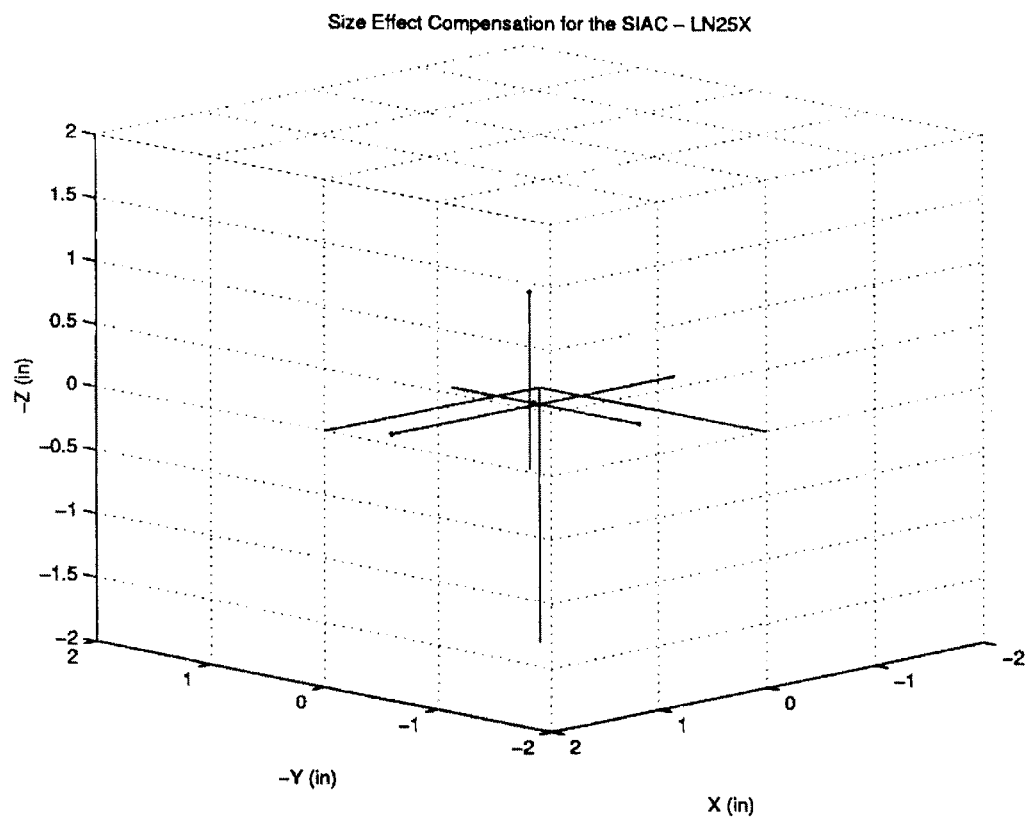
FIG. 3 shows for the GGP SIAC system the centers of percussions for the X, Y, and Z axis accelerometers, the center of navigation being shown by the dot near the middle of the figure.

The optimal center of navigation will be derived below. The centers of percussion and the center of navigation are shown in FIG. 3. For the SIAC and an angular rate applied in the X direction, Equations (69)–(71) simplify to $$\Delta \hat{v}_{BCx}{}^n = 0 \tag{108}$$

$$\Delta \hat{v}_{BCy}{}^n = \Delta t [-(\hat{w}_x{}^n)^2 R_{yy} + (\hat{w}_x{}^{n-1}) \Delta \phi_x{}^{n-\frac{1}{2}} R_{yz}] \tag{109}$$

$$\Delta \hat{v}_{BCx}{}^n = \Delta t [-(\hat{w}_x{}^n)^2 R_{zz} + (\hat{e}_x{}^{n-1}) R_{yz}] \tag{110}$$

Using Equations (96)–(98) and (108)–(110), we obtain $$E_{Bx} = 0 \tag{111}$$

$$E_{By} = T_1 R_{yy} - T_2 R_{yz} \tag{112}$$

$$E_{Bz} = T_1 R_{zz} + T_3 R_{yz} \tag{113}$$

The acceleration error (see Equation (80)) is given by $$\Delta \hat{a}_N^n = \frac{\vec{E}_N^n}{\Delta t} \tag{114}$$

should be zero mean for perfect size effect compensation. The AC terms in the navigation frame velocity error (see Equation (80)) produce a zero net change in velocity and therefore zero net change in acceleration.

The body error $\vec{E}_B$ is simplified by substituting Equations (96)–(98) and Equations (108)–(110) into Equations (111)–(113). The DC portion of Equation (80) is a combination of the DC terms of $C_B{}^{N,n}$ multiplied by the DC terms of $\vec{E}_B$. In addition, the product of the harmonics in $C_B{}^{N,n}$ and $\vec{E}_B$ also produce DC terms since $$2\sin^2(wt) = \underbrace{1}_{DC} - \underbrace{\cos(2wt)}_{AC}. \tag{115}$$

The direction cosine matrix (combination of Equations (102) and (104)) can be expanded using Bessel functions, i.e.

$$\cos(\phi_x^{(n-\frac{1}{2})}) = \cos(K_1) C_{1,n} - \sin(K_1) C_{2,n} \tag{116}$$

$$\sin(\phi_x^{(n-\frac{1}{2})}) = \sin(K_1) C_{1,n} + \cos(K_1) C_{2,n}. \tag{117}$$

where $$K_1 = \epsilon \sin(w\Delta t) \tag{118}$$

$$C_{1,n} = J_0(\epsilon) + 2 \sum_{m=1}^{\infty} J_{2m}(\epsilon) \cos(2mnw\Delta t) \tag{119}$$

$$C_{2,n} = 2 \sum_{m=1}^{\infty} J_{2m-1}(\epsilon) \sin((2m-1)nw\Delta t). \tag{120}$$

and $J_x(\theta)$ represents the Bessel function of the argument $\theta$ and order x.

If $$\frac{J_3(\epsilon)}{J_1(\epsilon)} \ll 1, \ \epsilon \ll 3 \tag{121}$$

then $$\sin(K_1) = 2J_1(\epsilon) \sin(w\Delta t) \tag{122}$$

and if $$\frac{J_2(\epsilon)}{J_0(\epsilon)} \ll 1/2, \ \epsilon \ll 3/2 \tag{123}$$

then $$\cos(K_1) = J_0(\epsilon) \tag{124}$$

If $$\frac{J_2(\epsilon)}{J_1(\epsilon)} \ll 1, \ \epsilon \ll 3/2 \tag{125}$$

then $$C_{1,n} \approx J_0(\epsilon) \tag{126}$$

$$C_{2,n} \approx 2J_1(\epsilon) \sin(nw\Delta t) \tag{127}$$

This means only the DC and first harmonic terms of the error $\vec{E}$ (see Equations (111)–(113)) are important.

The important terms from Equations (111)–(113) are $$<T_1> = \frac{\epsilon^2}{\Delta t} \left[ 1 - \cos(w\Delta t) - \frac{(w\Delta t)^2}{2} \right] \tag{128}$$

$$<T_2> = \frac{2\epsilon^2}{\Delta t} \left[ \cos\left(\frac{3}{4} w\Delta t\right) - \cos\left(\frac{1}{4} w\Delta t\right) \right][-1 + \cos(w\Delta t)] \tag{129}$$

$$<T_3> = -\frac{2\epsilon}{\Delta t} \sin(nw\Delta t) \left[ (w\Delta t) \sin\left(\frac{1}{2} w\Delta t\right) + 2[\cos\left(\frac{3}{4} w\Delta t\right) - \cos\left(\frac{1}{4} w\Delta t\right)] \cos(w\Delta t) \right] \tag{130}$$

If $$w \ll \frac{\sqrt{20}}{\Delta t} \tag{131}$$

then $$\cos(w\Delta t) \approx 1 - \frac{(w\Delta t)^2}{2} + \frac{(w\Delta t)^4}{24} \tag{132}$$

$$\sin(w\Delta t) \approx w\Delta t - \frac{(w\Delta t)^3}{6} \tag{133}$$

and the important terms simplify as $$<T_1> \approx \frac{1}{24}\frac{\epsilon^2}{\Delta t}(w\Delta t)^4 \tag{134}$$

$$<T_2> \approx \frac{1}{4}\frac{\epsilon^2}{\Delta t}(w\Delta t)^4 \tag{135}$$

$$<T_3> \approx \frac{\epsilon}{\Delta t}\frac{49}{96}(w\Delta t)^4 \sin(nw\Delta t) \tag{136}$$

For $$\epsilon \ll 1 \tag{137}$$

$$J_0(\epsilon) = \frac{\epsilon^0}{2^0 0!}\left(1 - \frac{\epsilon^2}{2} + \frac{\epsilon^4}{2}\cdots\right) \approx 1 \tag{138}$$

$$J_1(\epsilon) = \frac{\epsilon^1}{2^1 1!}\left(1 - \frac{\epsilon^2}{6} + \cdots\right) \approx \frac{\epsilon}{2}, \tag{139}$$

the acceleration error is given by $$\Delta \hat{a}_{N_x} = 0 \tag{140}$$

$$\Delta \hat{a}_{N_y} \approx \frac{\epsilon^2}{24\Delta t^2}(w\Delta t)^4\left[-\underline{R_{yy}} + \frac{R_{yz}}{8}\right] \tag{141}$$

$$\Delta \hat{a}_{N_z} \approx \frac{\epsilon^2}{24\Delta t^2}(w\Delta t)^4\left[-\underline{R_{zz}} + \frac{R_{yz}}{8}\right] \tag{142}$$

The underlined terms are due to angular rate w, while the other terms are due to angular acceleration $\dot{w}$. The harmonic terms that create DC are from $T_3$ and the direction cosine matrix $C_B^{N,n}$, and reduce the impact of the angular acceleration $\dot{w}$. terms in Equations (140)–(142).

A similar process is used to develop a sinusoidal angular rate input from an arbitrary direction and given the conditions in Equations (131) and (137). The acceleration error is given by $$\Delta \hat{a}_{N_x} = \frac{\epsilon^2(w\Delta t)^4}{24\Delta t^2}\left[-(c_y^2 + c_z^2)\underline{R_{xx}} + c_x c_y \underline{R_{yx}} + \right.$$
$$\left. c_x c_x \underline{R_{xx}} + \frac{c_x^2}{8}R_{xy} - \frac{c_x c_x}{8}R_{xy} + \frac{c_y^2}{8}R_{xx} - \frac{c_x c_y}{8}R_{yx}\right] \tag{143}$$

$$\Delta \hat{a}_{N_y} = \frac{\epsilon^2(w\Delta t)^4}{24\Delta t^2}\left[c_x c_y \underline{R_{xy}} - (c_x^2 + c_z^2)\underline{R_{yy}} + \right.$$
$$\left. c_y c_x \underline{R_{zy}} + \frac{c_x^2}{8}R_{yx} - \frac{c_y c_8}{8}R_{xx} + \frac{c_x^2}{8}R_{yx} - \frac{c_x c_y}{8}R_{xz}\right] \tag{144}$$

$$\Delta \hat{a}_{N_z} = \frac{\epsilon^2(w\Delta t)^4}{24\Delta t^2}\left[c_x c_z \underline{R_{xz}} + c_y c_x \underline{R_{yz}} - \right.$$
$$\left. (c_x^2 + c_y^2)\underline{R_{zz}} - \frac{c_y c_x}{8}R_{yx} + \frac{c_y^2}{8}R_{zx} - \frac{c_x c_z}{8}R_{xy} + \frac{c_x^2}{8}R_{xy}\right] \tag{145}$$

The acceleration error depends on the input angular rate and the center of navigation (see Equations (106) and (107)). The mean squared error (MSE) is the sum of the square of the errors in the three axis, i.e.

$$\text{MSE} = \Delta \hat{a}_{N_x}^2 + \Delta \hat{a}_{N_y}^2 + \Delta a_{N_z}^2. \tag{146}$$

The total error is the sum of the MSE over all input directions, i.e.

$$\text{TE} = \frac{1}{4\pi}\int_{C_x}\int_{C_y}\int_{C_z}\text{MSE}\,dc_x dc_y dc_z \tag{147}$$

where $\frac{1}{4\pi}$ is the normalization constant such that for MSE=1( ), TE=1( ). Given the constraints in Equation (7), the total error is simplified using spherical coordinates where $$c_x = \sin(\phi_s)\cos(\theta_s) \tag{148}$$

$$c_y = \sin(\phi_s)\sin(\theta_s) \tag{149}$$

$$c_z = \sin(\phi_s). \tag{150}$$

and $$TE = \frac{1}{4\pi}\int_{\phi_s=0}^{\pi}\int_{\theta_s=0}^{2\pi}MSE(\phi_s,\theta_s)\sin\phi_s\,d\theta_s\,d\phi_s \tag{151}$$

Figure 4:
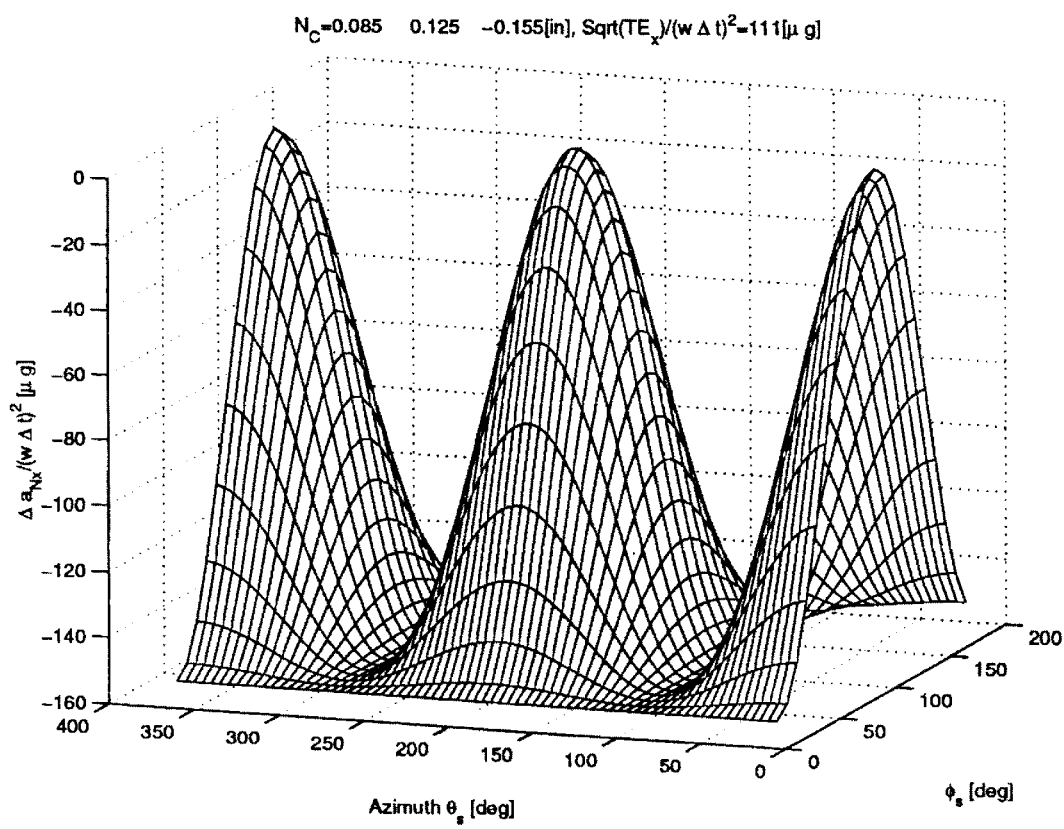
FIG. 4 shows for the GGP SIAC Nominal system the X accelerometer normalized acceleration error for sinusoidal rotation with amplitude we=1, arbitrary direction being specified in spherical coordinates $\phi_s$ and $\theta_s$ (see Equations 148–150).
Figure 5:
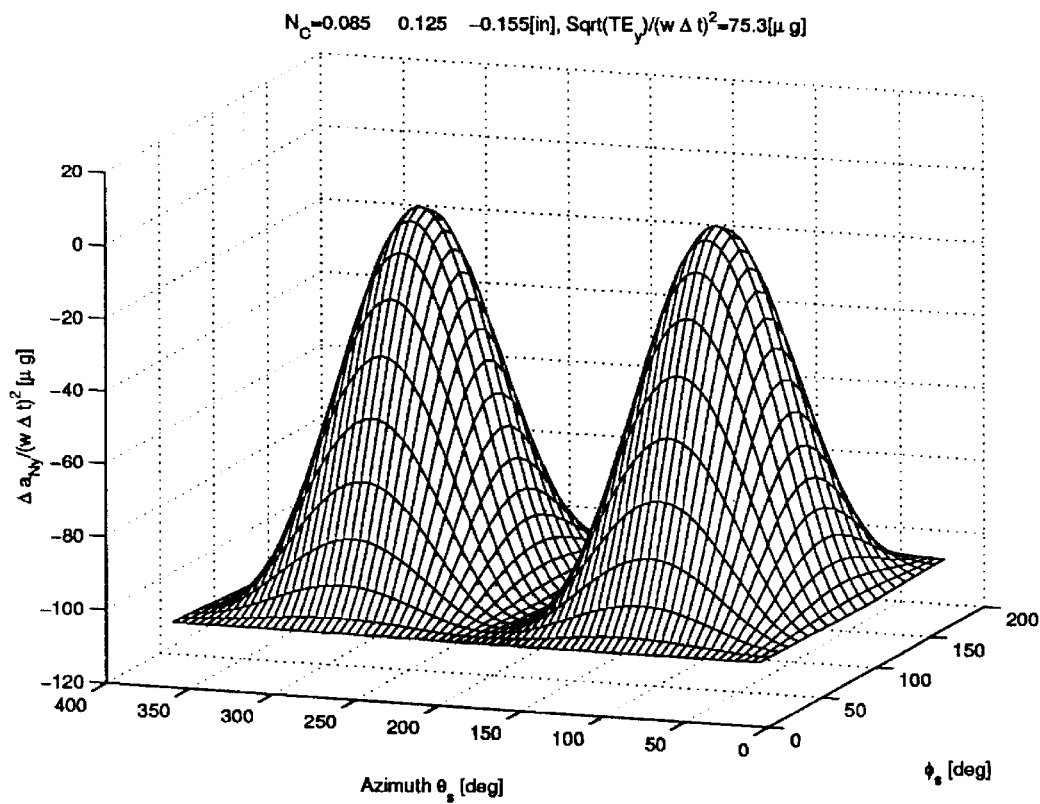
FIG. 5 shows for the GGP SIAC Nominal system Y accelerometer normalized acceleration error for sinusoidal rotation with amplitude we=1, arbitrary direction being specified in spherical coordinates $\phi_s$ and $\theta_s$, (see Equations 148–150).
Figure 6:
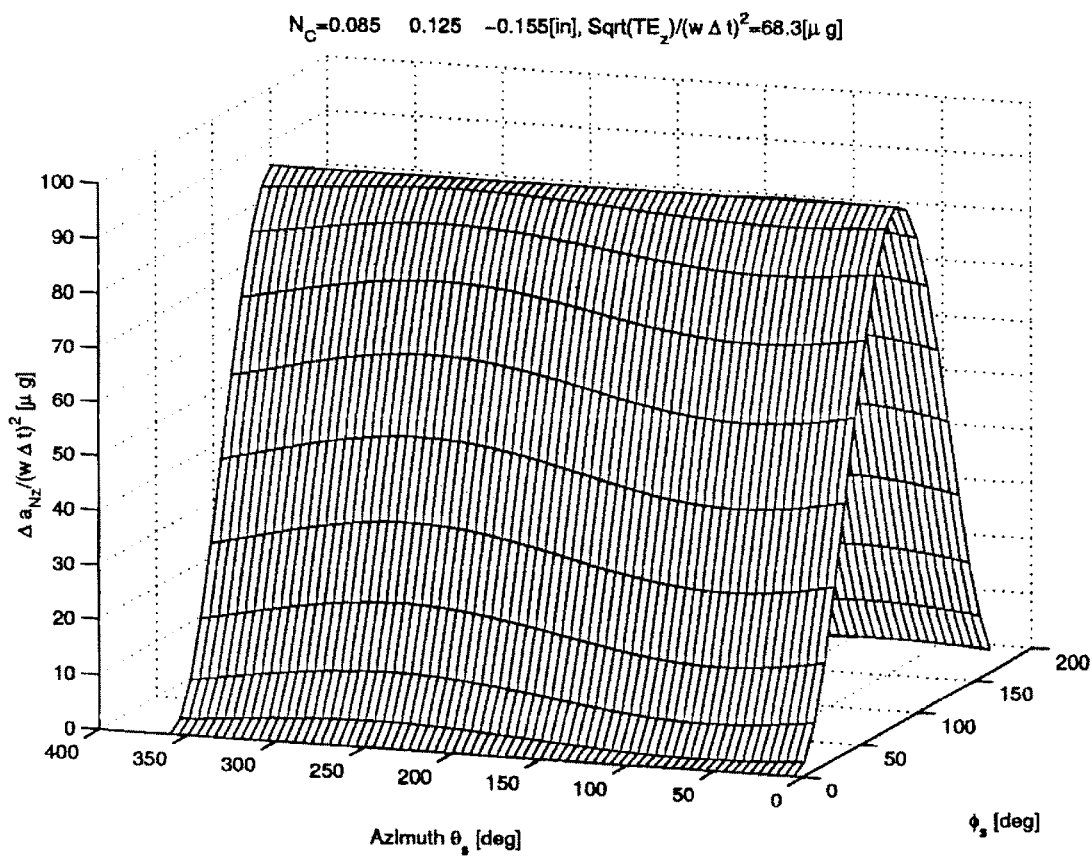
FIG. 6 shows for the GGP SIAC Nominal system Z accelerometer normalized acceleration error for sinusoidal rotation with amplitude we=1, arbitrary direction being specified in spherical coordinates $\phi_s$ and $\theta_s$ (see Equations 148–150).

The total error can be expanded as $$TE = TE_x + TE_y + TE_z \tag{152}$$

where $TE_X$ is the total error assuming $MSE = \Delta \hat{a}_{N_x}^2$ and $TE_y$ and $TE_z$ have similar definitions. An example for the SIAC system (split difference center of navigation=nominal, see Equation (106)) of the normalized acceleration error as a function of $\phi_s$ and $\theta_s$ for the X-, Y-, and Z-axis accelerometers is shown in FIGS. 4, 5, and 6 respectively. The error plots assume $\epsilon = 1/w$. FIGS. 4, 5, and 6 show the normalized acceleration error for sinusoidal rotation with amplitude $w\epsilon = 1$ and arbitrary direction specified in spherical coordinates $\theta_s$ and $\phi_s$ (see Equations (148)–(150)).

The coordinates ($N_{Cx}$, $N_{Cy}$, $N_{Cz}$) that produce a minimum total error TE define the optimal navigation center which is determined by simultaneously solving the equations $$\frac{d}{dN_{Cx}}[TE] = 0 \tag{153}$$

$$\frac{d}{dN_{Cy}}[TE] = 0 \tag{154}$$

$$\frac{d}{dN_{Cz}}[TE] = 0 \tag{155}$$

The optimal navigation center $\vec{N}_C$ given lever arms produced with an arbitrary coordinate origin $$N_{Cx} = -\frac{1}{70}[64X_{Px} + 3(Z_{Px} + Y_{Px})] \tag{156}$$

$$N_{Cy} = -\frac{1}{70}[64Y_{Py} + 3(Z_{Py} + Y_{Py})] \tag{157}$$

$$N_{Cz} = -\frac{1}{70}[64Z_{Pz} + 3(X_{Pz} + Y_{Pz})] \tag{158}$$

Assuming $\epsilon = 1/w$, the navigation frame acceleration error (see Equations (143)–(145)) can be normalized by $(w\Delta t)$. Universal performance curves are generated that are independent of the product of frequency and sampling time.

Given the lever arms in Equation (105), the optimal navigation center for the accelerometer configuration discussed previously has the coordinates $N_{Cx} = -1.1968$, $N_{Cy} = -0.7454$, and $N_{Cz} = 0.6331$.

Figure 7:
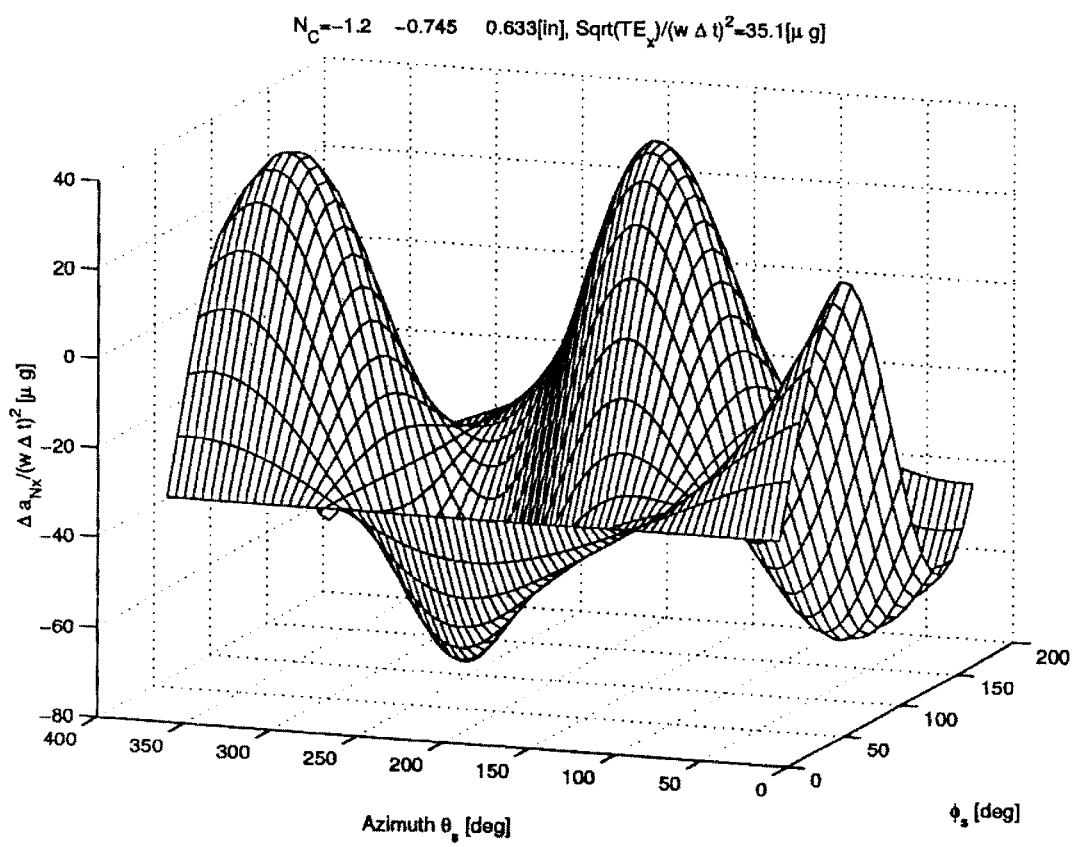
FIG. 7 shows for the GGP SIAC Nominal system X accelerometer normalized acceleration error for sinusoidal rotation with amplitude we=1, arbitrary direction being specified in spherical coordinates $\phi_s$ and $\theta_s$ (see Equations 148–150).
Figure 8:
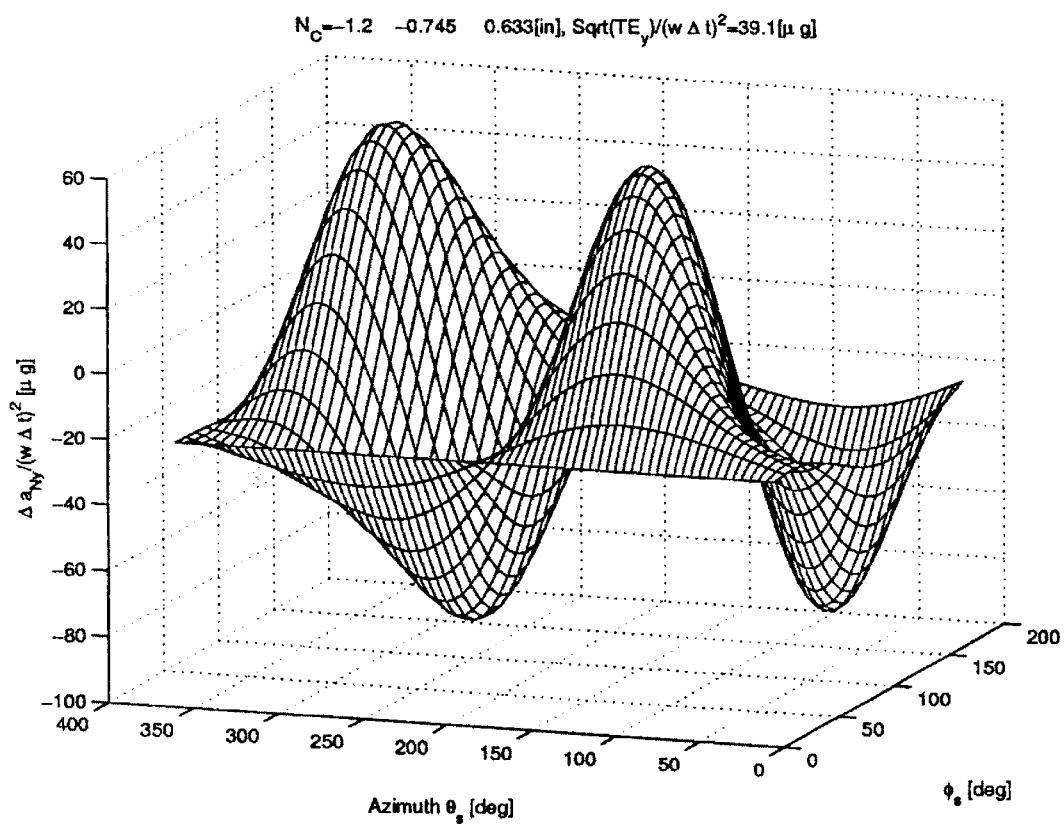
FIG. 8 shows for the GGP SIAC Nominal system Y accelerometer normalized acceleration error for sinusoidal rotation with amplitude we=1, arbitrary direction being specified in spherical coordinates $\phi_s$ and $\theta_s$ (see Equations 148–150).
Figure 9:
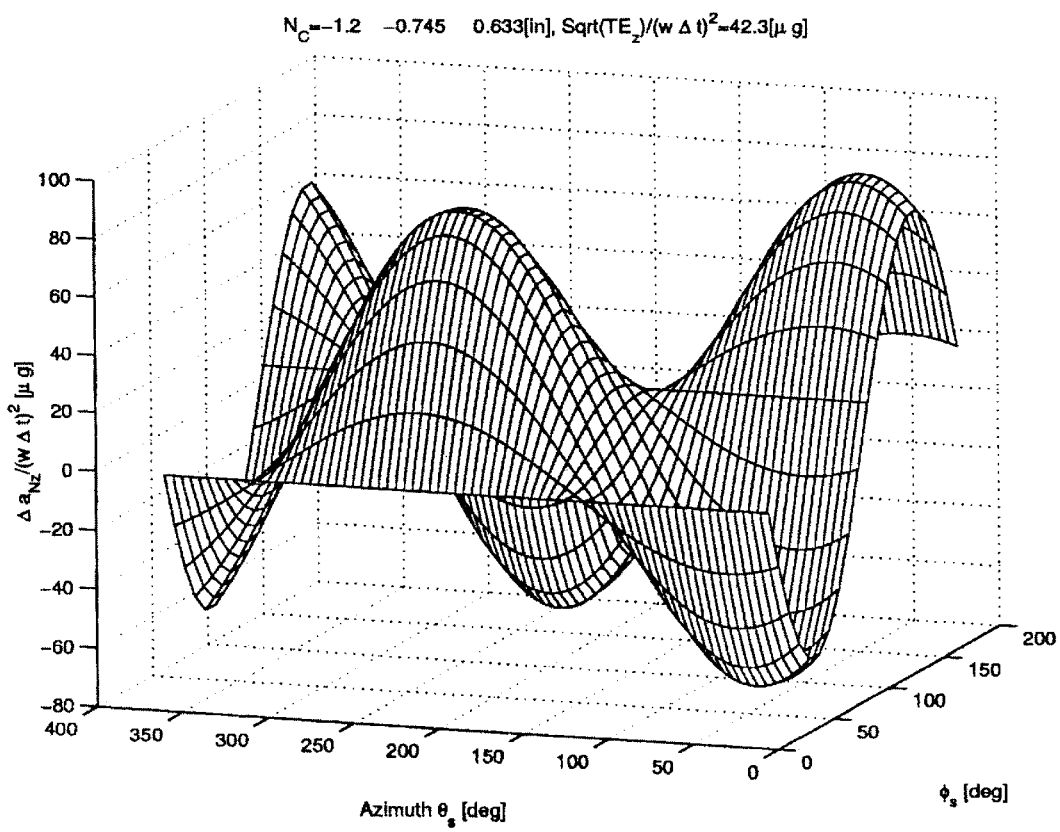
FIG. 9 shows for the GGP SIAC Nominal system Z accelerometer normalized acceleration error for sinusoidal rotation with amplitude we=1, arbitrary direction being specified in spherical coordinates $\phi_s$ and $\theta_s$ (see Equations 148–150).

An example for the SIAC system (optimal navigation center) of the normalized acceleration error for sinusoidal rotation as a function of direction specified in spherical coordinates $\phi_s$ and $\theta_s$ for the X, Y, and Z axis accelerometers is shown in FIGS. 7, 8, and 9 respectively. The error plots assume $\epsilon=1/w$.

The A4 BR accelerometer module consists of accelerometers for all three axes within the same package. The centers of percussion for this configuration are respectfully $\vec{X}_P=[0.845\ 0\ 0]$ $\vec{Y}_P=[0\ -0.070\ 0]$ $\vec{Z}_P=[0\ 0.285\ 0.009]$ (159)

where the dimensions are in inches. Since the cross terms are inherently small, past mechanisms for size effect did not include change in angular rate terms (see Equations (69)–(71), all $\Delta\dot{\theta}$ a terms were neglected), so results presented here are not indicative of how those systems would perform. The coordinates of the center of navigation were nominally $N_{Cx}=0$, $N_{Cy}=0$, and $N_{Cz}=0$.

Figure 10:
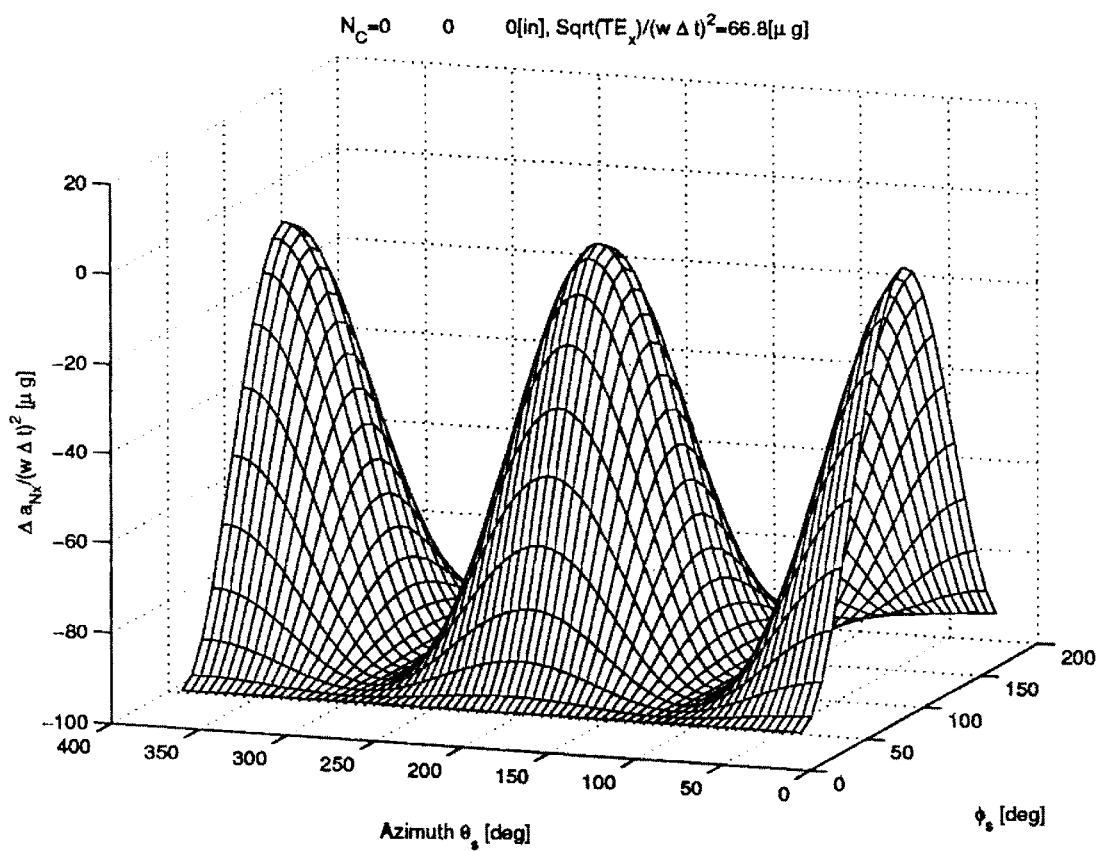
FIG. 10 shows for the A4 BR Nominal system X accelerometer normalized acceleration error for sinusoidal rotation with amplitude we=1, arbitrary direction being specified in spherical coordinates $\phi_s$ and $\theta_s$ (see Equations 148–150).
Figure 11:
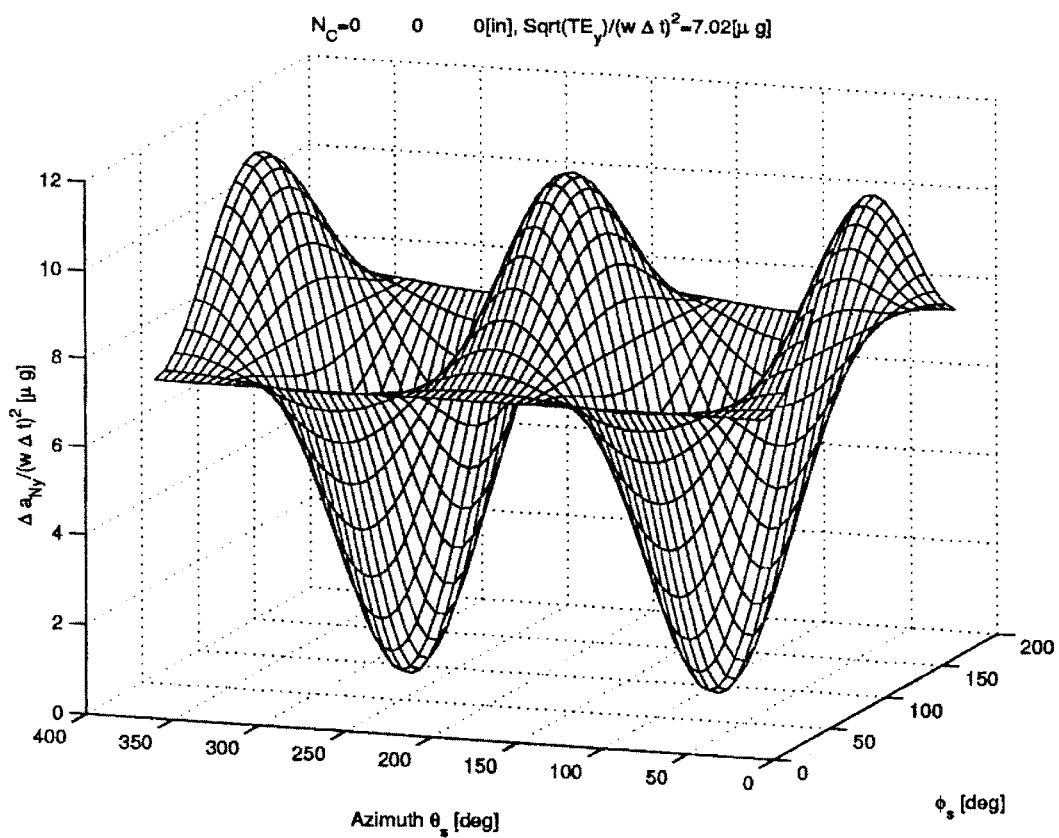
FIG. 11 shows for the A4 BR Nominal system Y accelerometer normalized acceleration error for sinusoidal rotation with amplitude we=1, arbitrary direction being specified in spherical coordinates $\phi_s$ and $\theta_s$ (see Equations 148–150).
Figure 12:
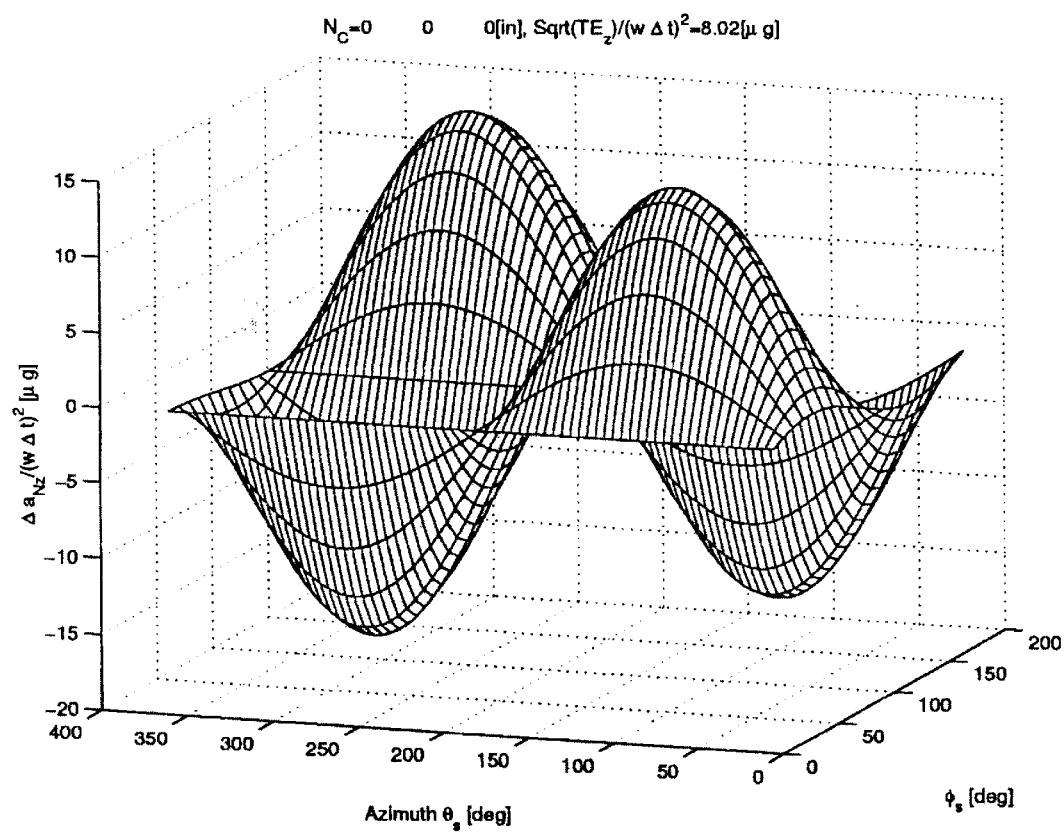
FIG. 12 shows for the A4 BR Nominal system Z accelerometer normalized acceleration error for sinusoidal rotation with amplitude we=1, arbitrary direction being specified in spherical coordinates $\phi_s$ and $\theta_s$ (see Equations 148–150).
Figure 13:
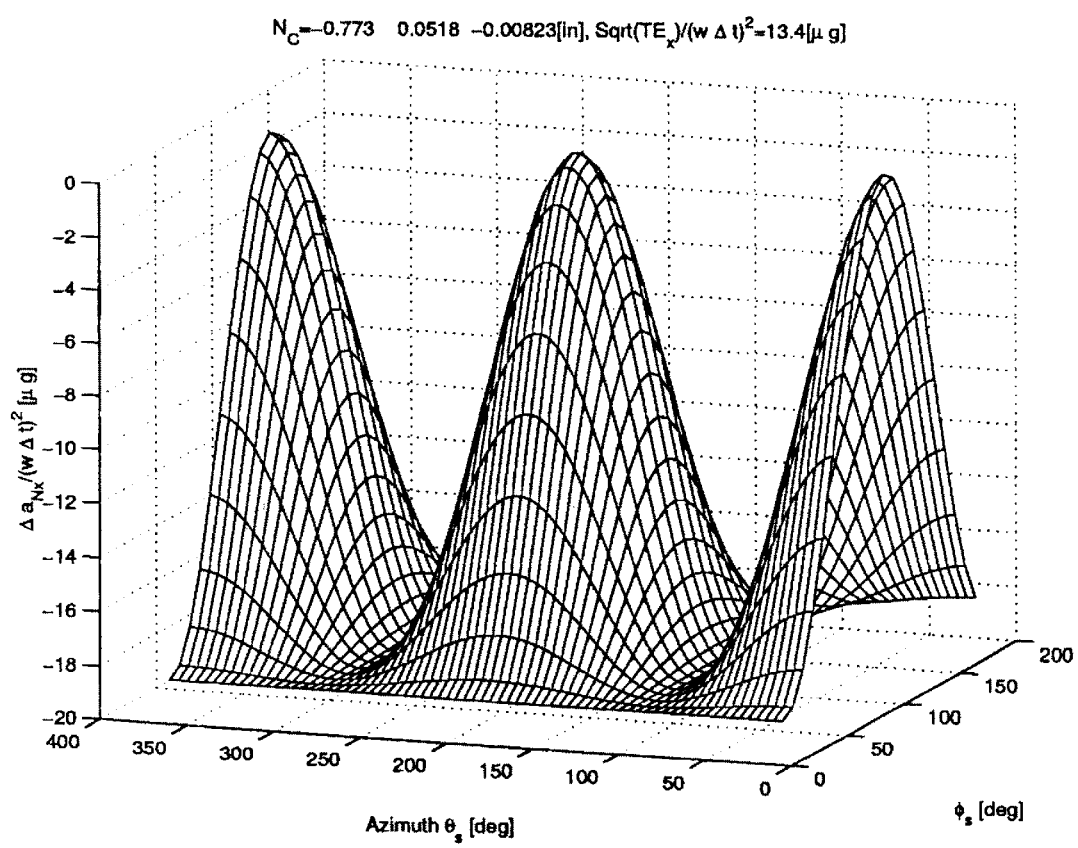
FIG. 13 shows for the A4 BR Optimal system X accelerometer normalized acceleration error for sinusoidal rotation with amplitude we=1, arbitrary direction being specified in spherical coordinates $\phi_s$ and $\theta_s$ (see Equations 148–150).
Figure 14:
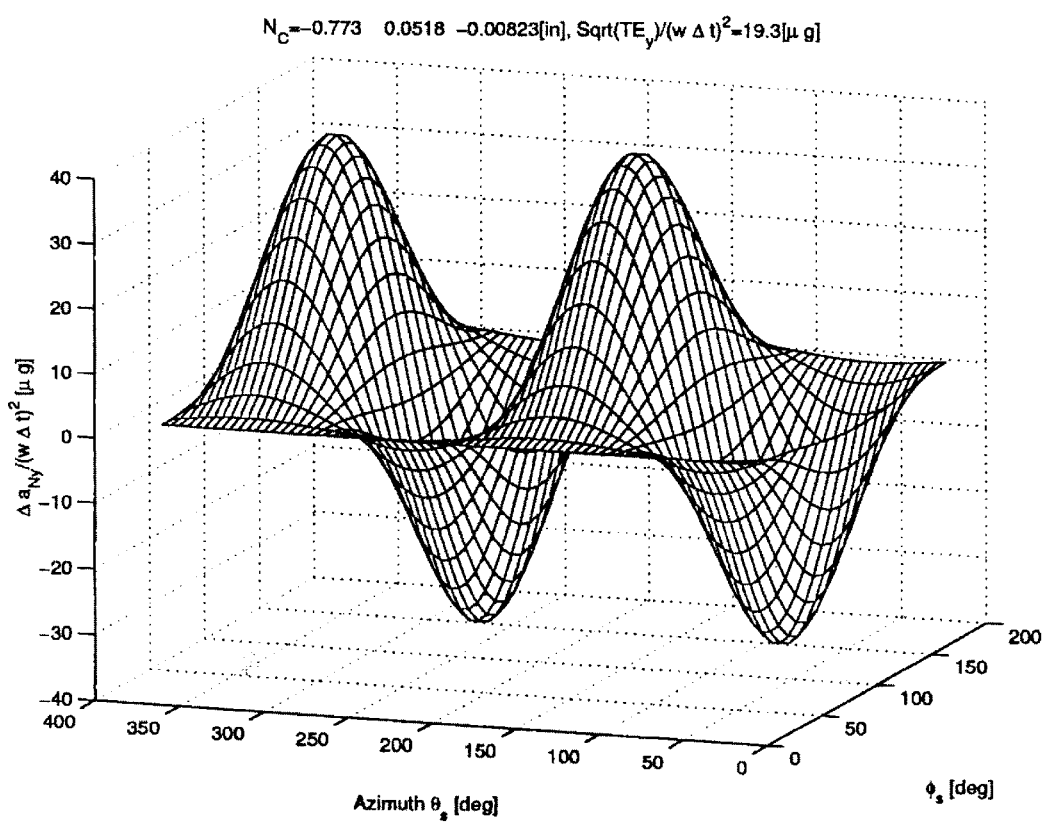
FIG. 14 shows for the A4 BR Optimal system Y accelerometer normalized acceleration error for sinusoidal rotation with amplitude we=1, arbitrary direction being specified in spherical coordinates $\phi_s$ and $\theta_s$ (see Equations 148–150).
Figure 15:
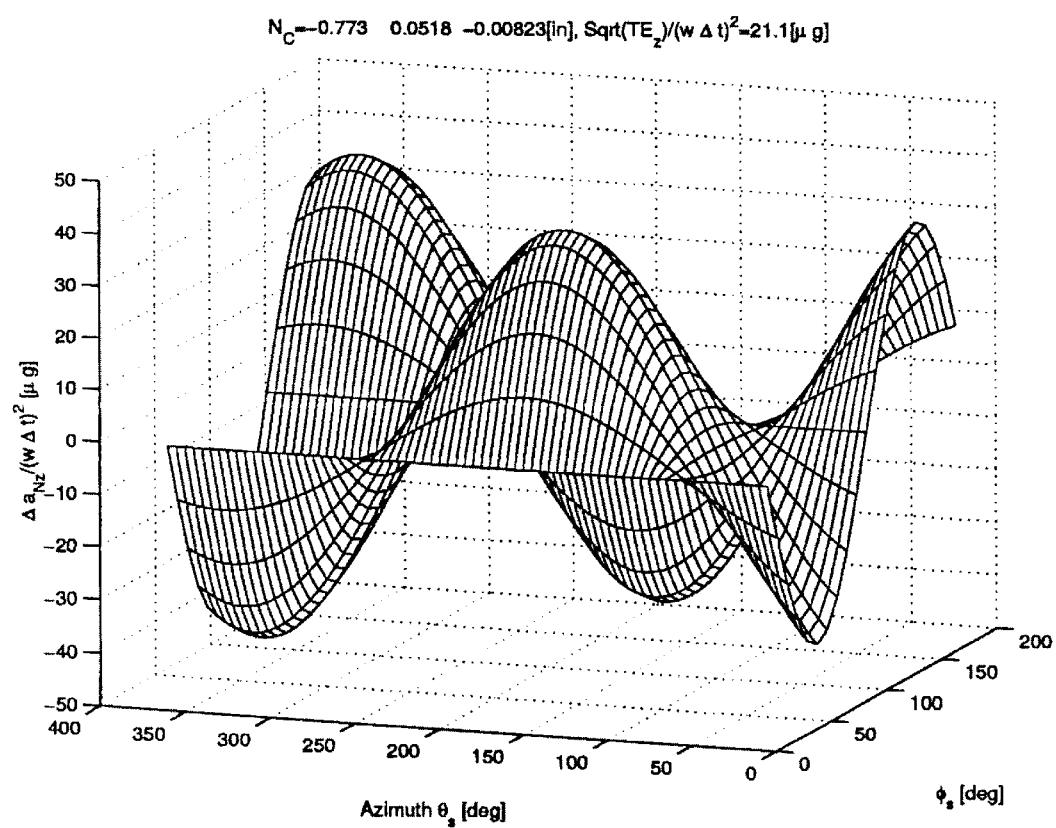
FIG. 15 shows for the A4 BR Optimal system Z accelerometer normalized acceleration error for sinusoidal rotation with amplitude we=1, arbitrary direction being specified in spherical coordinates $\phi_s$ and $\theta_s$ (see Equations 148–150).

For compensation as suggested herein the normalized error surfaces for the nominal center of navigation are shown in FIGS. 10, 11, and 12 for sinusoidal rotation as a function of direction specified in spherical coordinates $\phi_s$ and $\theta_s$ for the X, Y, and Z axis accelerometers. The optimal navigation center $N_{Cx}=-0.7726$, $N_{Cy}=0.0518$, and $N_{Cz}=-0.008$ and the normalized error surfaces are shown in FIGS. 13, 14, and 15.

Figure 16:
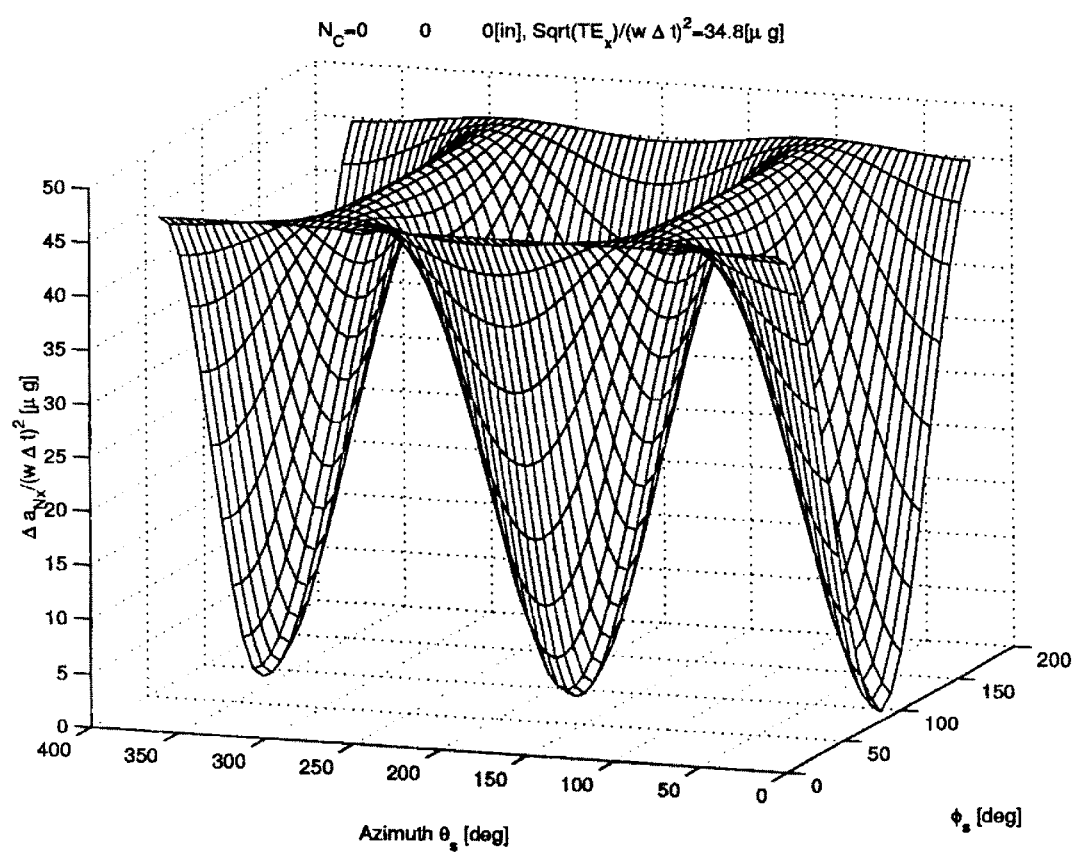
FIG. 16 shows for the A4 CR Nominal system X accelerometer normalized acceleration error for sinusoidal rotation with amplitude we=1, arbitrary direction being specified in spherical coordinates $\phi_s$ and $\theta_s$ (see Equations 148–150).
Figure 17:
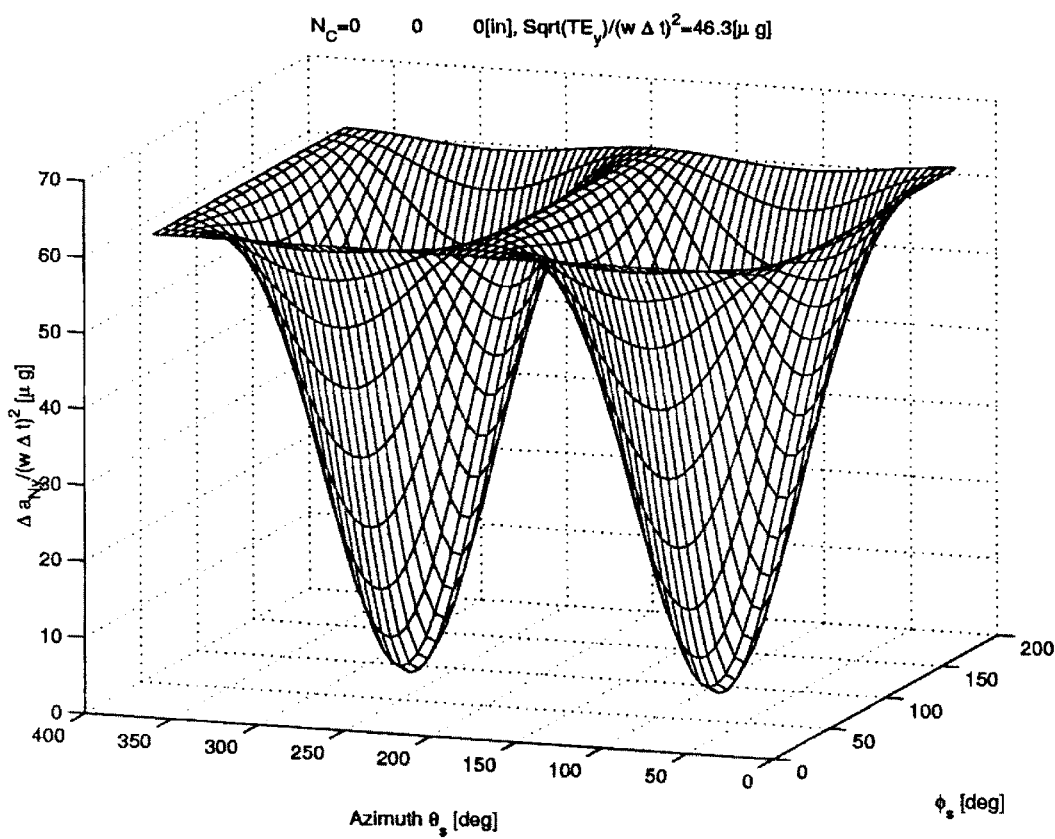
FIG. 17 shows for the A4 CR Nominal system Y accelerometer normalized acceleration error for sinusoidal rotation with amplitude we=1, arbitrary direction being specified in spherical coordinates $\phi_s$ and $\theta_s$ (see Equations 148–150).
Figure 18:
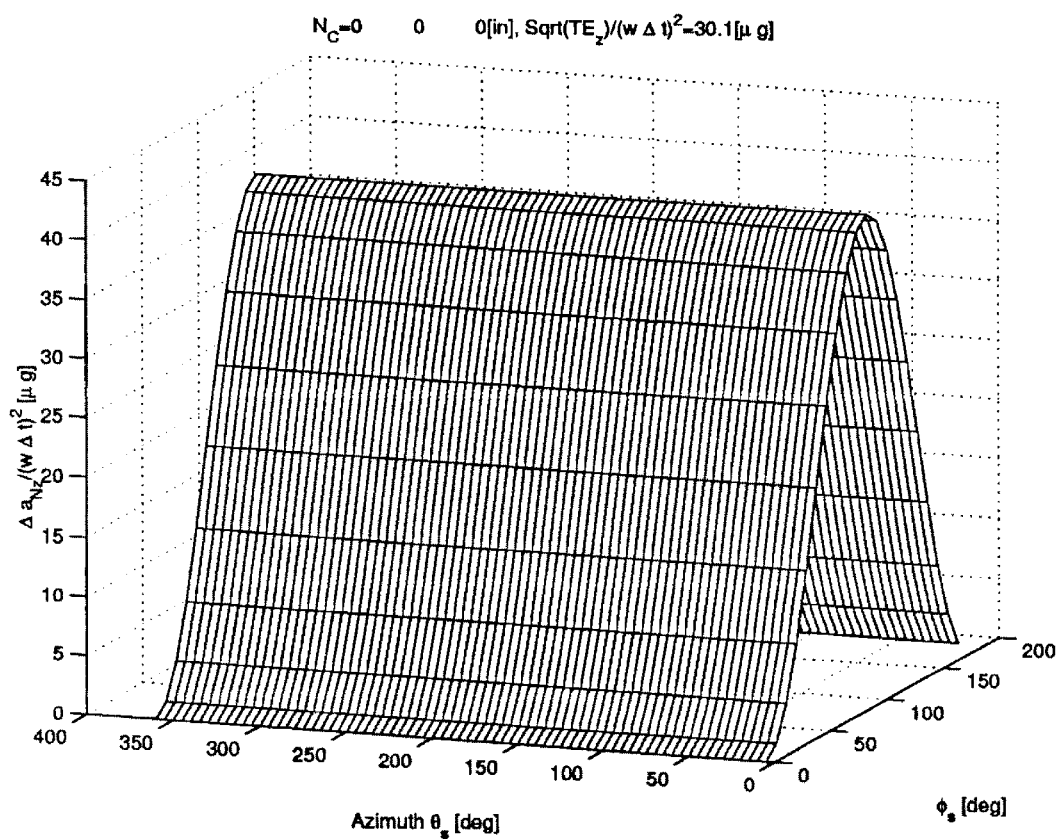
FIG. 18 shows for the A4 CR Nominal system Z accelerometer normalized acceleration error for sinusoidal rotation with amplitude we=1, arbitrary direction being specified in spherical coordinates $\phi_s$ and $\theta_s$ (see Equations 148–150).
Figure 19:
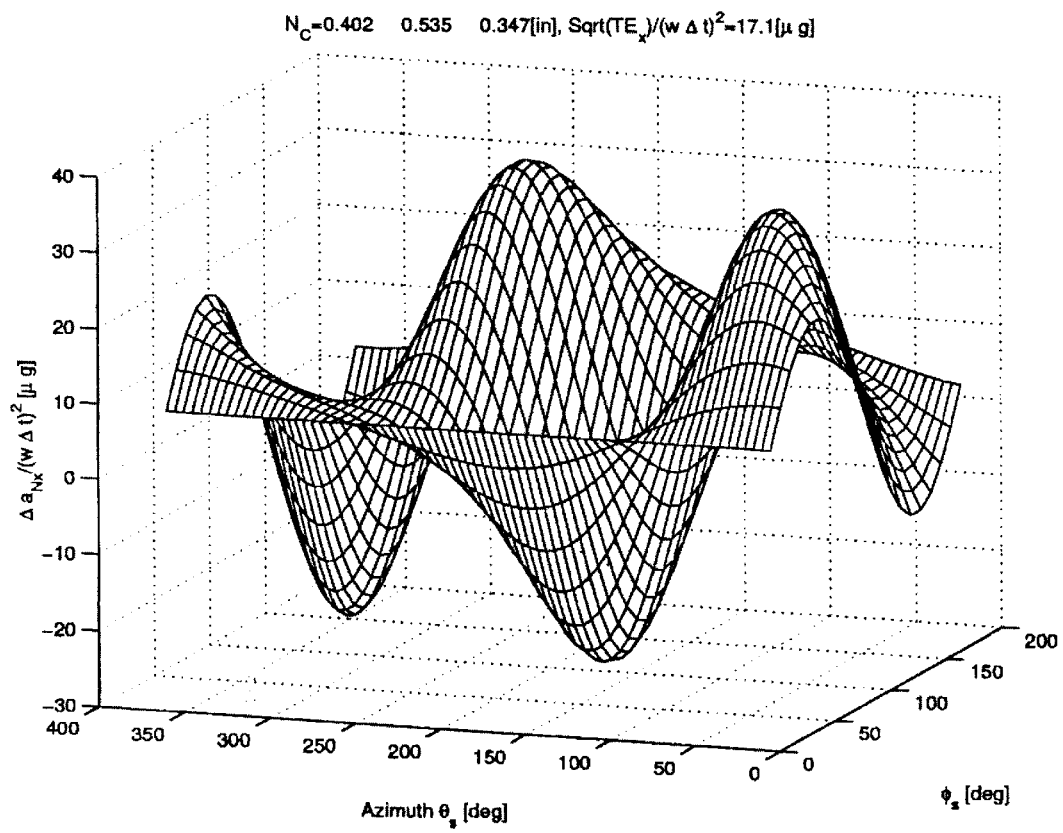
FIG. 19 shows for the A4 CR Optimal system X accelerometer normalized acceleration error for sinusoidal rotation with amplitude we=1, arbitrary direction being specified in spherical coordinates $\phi_s$ and $\theta_s$ (see Equations 148–150).
Figure 20:
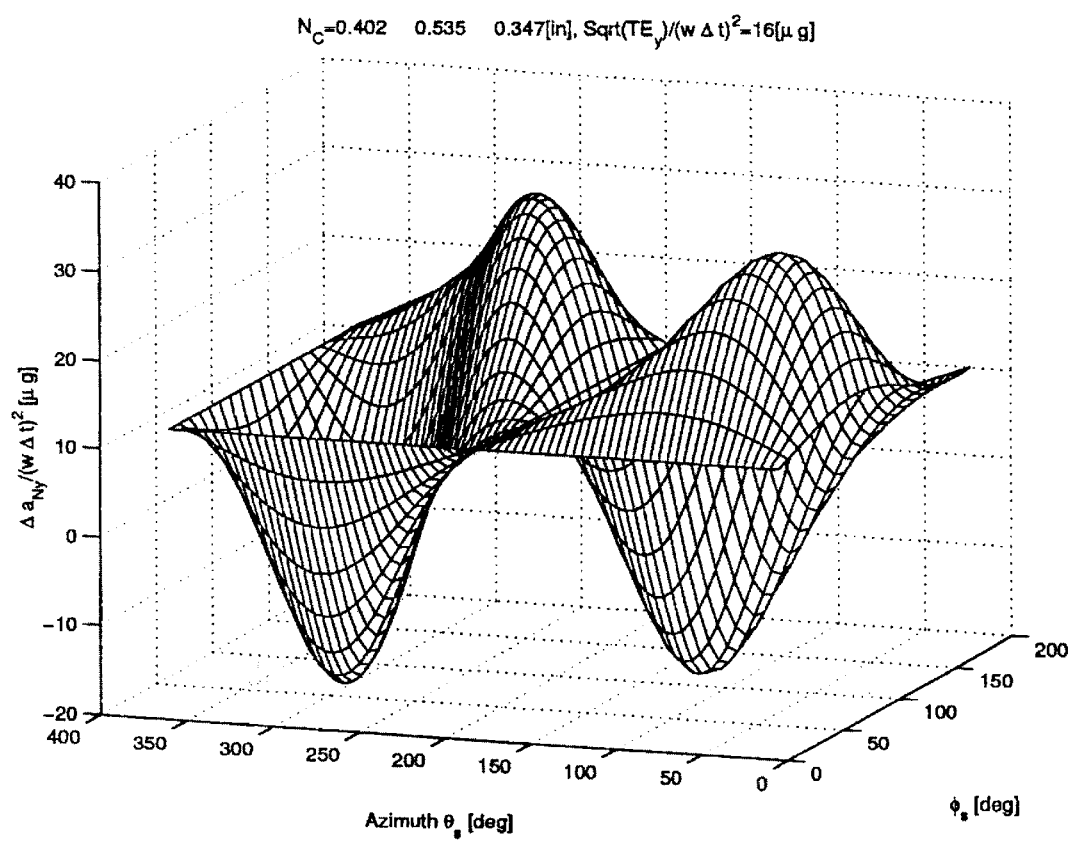
FIG. 20 shows for the A4 CR Optimal system Y accelerometer normalized acceleration error for sinusoidal rotation with amplitude we=1, arbitrary direction being specified in spherical coordinates $\phi_s$ and $\theta_s$ (see Equations 148–150).
Figure 21:
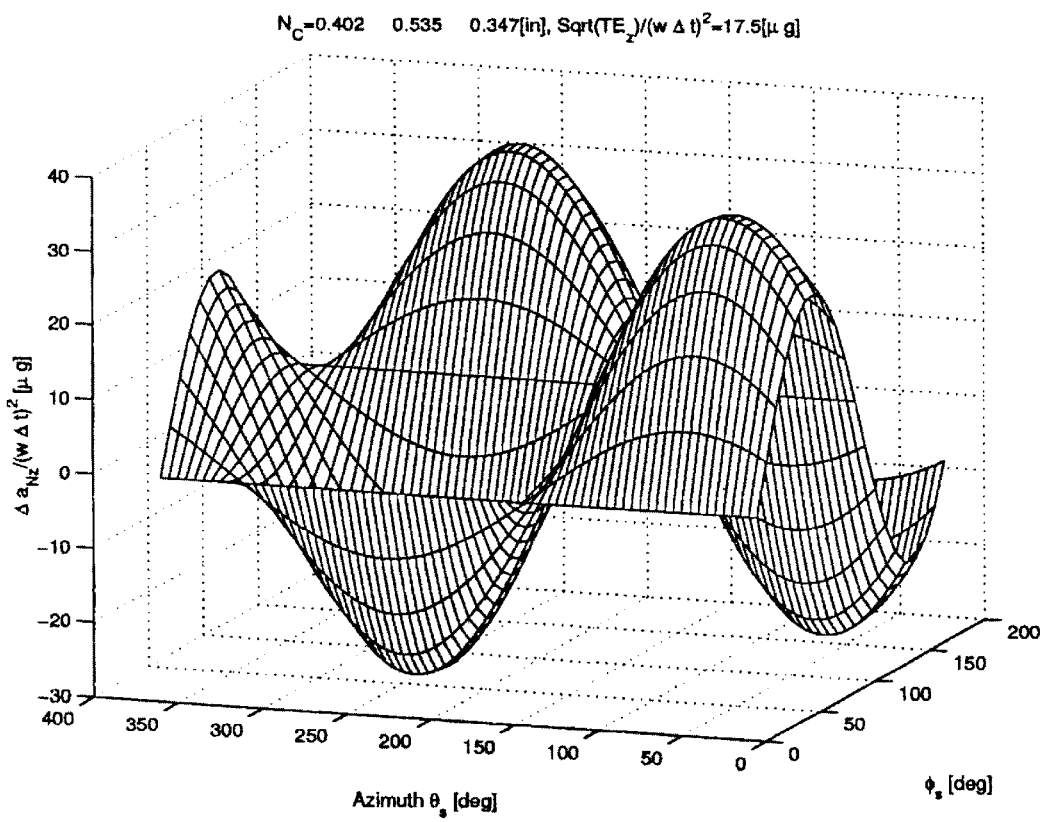
FIG. 21 shows for the A4 CR Optimal system Z accelerometer normalized acceleration error for sinusoidal rotation with amplitude we=1, arbitrary direction being specified in spherical coordinates $\phi_s$ and $\theta_s$ (see Equations 148–150).

The A4 CR accelerometer module consists of accelerometers for all three axes within the same package with centers of percussion $\vec{X}_P=[-0.440\ 0\ 0]$ $\vec{Y}_P=[0\ -0.585\ 0]$ $\vec{Z}_P=[0\ 0\ -0.380]$ (160)

where the dimensions are in inches. The center of navigation was nominally $N_{Cx}=0$, $N_{Cy}=0$, and $N_{Cz}=0$. For compensation as suggested herein, the normalized error surfaces for the nominal center of navigation are shown in FIGS. 16, 17, and 18. The optimal navigation center $N_{Cx}=0.4023$, $N_{Cy}=0.5349$, and $N_{Cz}=0.3474$, and the normalized error surfaces are shown in FIGS. 19, 20, and 21. The level arms and algorithm performance is summarized in FIG. 22. The accelerometer types are SIAC GGP ("S"), A4 BR ("BR"), AND A4 CR ("CR"). The navigation center is denoted by "—N" or "—O" where "N" stands for "nominal" and "O" stands for "optimal".

For a given accelerometer geometry within a system, the navigation center should be selected such that the compensation error is both distributed over the rotational input angle, and over the three accelerometer axes. This ensures that a system is not particularly sensitive to size effect errors in any given axis. The least squares approach is useful for determining the optimal center of navigation, which results in the optimal set of lever arms. The dominant dependence is the distances between a given accelerometer and its axis, i.e. the diagonals of the lever arm matrix.

What is claimed is:

1. A method for improving the accuracy of an inertial navigation system, the method comprising the steps:

obtaining a measure of the angular velocity of a body frame of reference having a first axis, a second axis, and a third axis;

obtaining a measure of the acceleration of (1) a first reference point in the direction of the first axis, (2) a second reference point in the direction of the second axis, and (3) a third reference point in the direction of the third axis, the first, second, and third reference points being fixed in the body frame;

determining compensated acceleration values, a compensated acceleration value being the difference of the measure of acceleration of a reference point and a compensation quantity, the compensation quantity being an estimate of the portion of the acceleration of the reference point resulting from the rotation of the body frame.

2. The method of claim 1 wherein the compensation quantity comprises a compensation term proportional to the vector cross product of a first vector and a second vector, the first vector being the angular velocity of the body frame, the second vector being the cross product of the angular velocity of the body frame and the vector connecting the navigation center to a reference point, an estimate of the angular velocity of the body frame being obtained by multiplying each of a plurality of measures of the angular velocity obtained at regular intervals in the past by a weight and summing the weighted measures of the angular velocity obtained during a specified time period in the past.

3. The method of claim 2 wherein the weights are all equal.

4. The method of claim 1 wherein the compensation quantity comprises a compensation term proportional to the cross product of the angular acceleration of the body frame and the vector connecting the navigation center to a reference point, an estimate of the angular acceleration of the body frame being obtained by multiplying each of a plurality of measures of the angular velocity obtained at regular intervals in the past by a weight and summing the weighted measures of the angular velocity obtained during a specified time period in the past.

5. The method of claim 4 wherein an estimate of the angular acceleration of the body frame is obtained by differencing first and second estimates of the angular velocity of the body frame, a first estimate of the angular velocity of the body being obtained by multiplying a first sequence of measures of the angular velocity obtained at regular intervals in the past by a first sequence of weights and summing the resulting first sequence of weighted measures of the angular velocity obtained during a specified time period in the past, a second estimate of the angular velocity of the body being obtained by multiplying a second sequence of measures of the angular velocity obtained at regular intervals in the past by a second sequence of weights and summing the resulting second sequence of weighted measures of the angular velocity obtained during a specified time period in the past.

6. The method of claim 5 wherein the first and second sequences of weights are the same.

7. The method of claim 6 wherein the weights in the first and second sequences of weights are all equal.

8. The method of claim 1 further comprising the step:

establishing the optimum navigation center based on a criterion of goodness.

9. The method of claim 8 wherein the criterion of goodness is minimal weighted acceleration error, acceleration error being a function of the direction of the angular velocity vector, weighted acceleration error being obtained by multiplying the acceleration error by a weighting function and integrating the result over all directions of the angular velocity vector.

10. The method of claim 9 wherein the weighting function has the same value for all directions of the angular velocity vector.

11. Apparatus for improving the accuracy of an inertial navigation system, the apparatus comprising:
- a means for obtaining from an external source a measure of the angular velocity of a body frame of reference having a first axis, a second axis, and a third axis;
- a means for obtaining from an external source a measure of the acceleration of (1) a first reference point in the direction of the first axis, (2) a second reference point in the direction of the second axis, and (3) a third reference point in the direction of the third axis, the first, second, and third reference points being fixed in the body frame;
- a processor for determining compensated acceleration values, a compensated acceleration value being the difference of the measure of acceleration of a reference point and a compensation quantity, the compensation quantity being an estimate of the portion of the acceleration of the reference point resulting from the rotation of the body frame.

12. The apparatus of claim 11 wherein the compensation quantity comprises a compensation term proportional to the vector cross product of a first vector and a second vector, the first vector being the angular velocity of the body frame, the second vector being the cross product of the angular velocity of the body frame and the vector connecting the navigation center to a reference point, an estimate of the angular velocity of the body frame being obtained by multiplying each of a plurality of measures of the angular velocity obtained at regular intervals in the past by a weight and summing the weighted measures of the angular velocity obtained during a specified time period in the past.

13. The apparatus of claim 11 wherein the weights are all equal.

14. The apparatus of claim 11 wherein the compensation quantity comprises a compensation term proportional to the cross product of the angular acceleration of the body frame and the vector connecting the navigation center to a reference point, an estimate of the angular acceleration of the body frame being obtained by multiplying each of a plurality of measures of the angular velocity obtained at regular intervals in the past by a weight and summing the weighted measures of the angular velocity obtained during a specified time period in the past.

15. The apparatus of claim 11 wherein an estimate of the angular acceleration of the body frame is obtained by differencing first and second estimates of the angular velocity of the body frame, a first estimate of the angular velocity of the body being obtained by multiplying a first sequence of measures of the angular velocity obtained at regular intervals in the past by a first sequence of weights and summing the resulting first sequence of weighted measures of the angular velocity obtained during a specified time period in the past, a second estimate of the angular velocity of the body being obtained by multiplying a second sequence of measures of the angular velocity obtained at regular intervals in the past by a second sequence of weights and summing the resulting second sequence of weighted measures of the angular velocity obtained during a specified time period in the past.

16. The apparatus of claim 15 wherein the first and second sequences of weights are the same.

17. The apparatus of claim 16 wherein the weights in the first and second sequences of weights are all equal.

18. The apparatus of claim 11 wherein the optimum navigation center is based on a criterion of goodness.

19. The apparatus of claim 18 wherein the criterion of goodness is minimal weighted acceleration error, acceleration error being a function of the direction of the angular velocity vector, weighted acceleration error being obtained by multiplying the acceleration error by a weighting function and integrating the result over all directions of the angular velocity vector.

20. The apparatus of claim 19 wherein the weighting function has the same value for all directions of the angular velocity vector.

* * * * *